(12) United States Patent
Horiuchi et al.

(10) Patent No.: US 11,735,963 B2
(45) Date of Patent: Aug. 22, 2023

(54) POLYGONAL FRAME STRUCTURE WITH ARMATURE CORE WITH CONNECTED AND OPEN CORE SHEETS INSIDE THE FRAME

(71) Applicant: SANYO DENKI CO., LTD., Tokyo (JP)

(72) Inventors: Manabu Horiuchi, Tokyo (JP); Yasushi Misawa, Tokyo (JP); Jun Kitajima, Tokyo (JP); Mai Shimizu, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 322 days.

(21) Appl. No.: 17/123,681

(22) Filed: Dec. 16, 2020

(65) Prior Publication Data
US 2021/0203198 A1    Jul. 1, 2021

(30) Foreign Application Priority Data

Dec. 26, 2019 (JP) ................................. 2019-235835

(51) Int. Cl.
*H02K 1/18* (2006.01)
*H02K 15/12* (2006.01)
*H02K 29/03* (2006.01)

(52) U.S. Cl.
CPC ............ *H02K 1/185* (2013.01); *H02K 15/12* (2013.01); *H02K 29/03* (2013.01); *H02K 2213/03* (2013.01)

(58) Field of Classification Search
CPC .......... H02K 1/185; H02K 1/18; H02K 1/148; H02K 7/09; H02K 15/12; H02K 29/03; H02K 2213/03
(Continued)

(56) References Cited

U.S. PATENT DOCUMENTS

| 493,337 | A | * | 3/1893 | Parshall | ................. | H02K 15/12 |
| | | | | | | 310/265 |
| 1,659,623 | A | * | 2/1928 | Barr | ....................... | H02K 1/185 |
| | | | | | | 310/410 |

(Continued)

FOREIGN PATENT DOCUMENTS

| JP | 2001-245455 A | 9/2001 |
| JP | 2005-304150 A | 10/2005 |

(Continued)

OTHER PUBLICATIONS

Japanese Office Action (JPOA) dated Oct. 9, 2020 for the corresponding Japanese Patent Application No. 2019-235835.
(Continued)

*Primary Examiner* — Maged M Almawri
(74) *Attorney, Agent, or Firm* — Rankin, Hill & Clark LLP

(57) ABSTRACT

In a frame structure of a motor, when the number of angles of a frame is 4M (M is a natural number, and M≥1), and the number of slots of an armature core is 6N (N is a natural number, and N≥1), the armature core is inserted into the frame in such a manner as to form a variation θ within a predetermined range in a circumferential direction between a reference line that is orthogonal to two opposing sides of the frame and passes through a rotation axis of the frame, and a straight line linking magnetic poles symmetric about a point with respect to the rotation axis.

19 Claims, 15 Drawing Sheets

(58) Field of Classification Search
USPC .......... 310/89, 415, 431–433, 427, 216.127,
310/216.129, 6, 4
See application file for complete search history.

(56) References Cited

U.S. PATENT DOCUMENTS

| | | | | |
|---|---|---|---|---|
| 1,771,475 A * | 7/1930 | Wright | ................ | H02K 1/185 310/407 |
| 1,795,882 A * | 3/1931 | Noden | ................ | H02K 1/185 310/216.049 |
| 2,001,799 A * | 5/1935 | Seyfried | ................ | H02K 1/185 310/414 |
| 2,023,259 A * | 12/1935 | Anderson | ................ | H02K 1/185 310/426 |
| 2,251,674 A * | 8/1941 | Gillen | ................ | H02K 17/10 310/216.049 |
| 2,478,316 A * | 8/1949 | Potter | ................ | H02K 1/185 310/216.127 |
| 2,523,520 A * | 9/1950 | Reinhard | ................ | H02K 1/185 310/410 |
| 2,689,394 A * | 9/1954 | Heinz | ................ | B23C 5/2295 407/51 |
| 2,711,492 A * | 6/1955 | Ballman | ................ | H02K 1/185 164/109 |
| 2,876,371 A * | 3/1959 | Wesolowski | ................ | H02K 1/16 310/216.049 |
| 2,939,021 A * | 5/1960 | Gilchrist | ................ | H02K 1/185 310/91 |
| 2,977,491 A * | 3/1961 | Hueffed | ................ | H02K 1/185 310/414 |
| 4,227,109 A * | 10/1980 | Mulach | ................ | H02K 1/16 310/216.049 |
| 4,286,187 A * | 8/1981 | Binder | ................ | H02K 7/1815 310/90 |
| 4,642,502 A * | 2/1987 | Carpenter | ................ | H02K 1/278 310/216.013 |
| 4,765,054 A * | 8/1988 | Sauerwein | ................ | H02K 3/522 310/216.115 |
| 4,797,602 A * | 1/1989 | West | ................ | H02K 11/048 310/156.28 |
| 5,015,904 A * | 5/1991 | Kleemann | ................ | H02K 3/325 310/194 |
| 5,319,270 A * | 6/1994 | Tanaka | ................ | H02K 11/21 310/216.096 |
| 5,487,213 A * | 1/1996 | Hult | ................ | H02K 5/148 29/596 |
| 5,742,991 A * | 4/1998 | Kurth | ................ | B29C 45/1747 425/589 |
| 5,793,136 A * | 8/1998 | Redzic | ................ | H02K 16/02 310/112 |
| 5,796,190 A * | 8/1998 | Takeda | ................ | H02K 7/1815 310/156.31 |
| 5,821,647 A * | 10/1998 | Takehara | ................ | H02K 7/14 310/90 |
| 5,850,679 A * | 12/1998 | Hoffman | ................ | B25B 27/026 29/252 |
| 5,949,169 A * | 9/1999 | Niimi | ................ | H02K 23/04 310/216.127 |
| 6,040,645 A * | 3/2000 | Lynch | ................ | H02K 23/54 310/227 |
| 6,124,567 A * | 9/2000 | Feldhausen | ................ | B23K 9/1006 310/52 |
| 6,225,722 B1 * | 5/2001 | Rupp | ................ | H02K 21/22 310/91 |
| 6,305,989 B1 * | 10/2001 | Quadir | ................ | H01R 13/533 439/685 |
| 6,310,320 B1 * | 10/2001 | Kraus | ................ | B23K 9/1075 219/133 |
| 6,317,963 B1 * | 11/2001 | Powers | ................ | H02K 15/14 310/58 |
| 6,320,287 B1 * | 11/2001 | Watson | ................ | H02K 1/185 310/91 |
| 6,346,760 B1 * | 2/2002 | Boardman, IV | ................ | H02K 1/16 310/216.118 |
| 6,498,417 B2 * | 12/2002 | Fuller | ................ | H02K 1/185 310/431 |
| 6,713,930 B2 * | 3/2004 | Shah | ................ | H02K 1/185 310/216.076 |
| 6,720,699 B1 * | 4/2004 | Shah | ................ | H02K 1/16 310/182 |
| 6,737,775 B2 * | 5/2004 | Hatz | ................ | H02K 7/1815 322/4 |
| 6,856,064 B2 * | 2/2005 | Masumoto | ................ | H02K 15/024 310/216.008 |
| 6,866,487 B2 * | 3/2005 | Abe | ................ | F04C 18/0215 417/410.5 |
| 6,979,930 B2 * | 12/2005 | Harada | ................ | H02K 1/16 310/216.004 |
| 7,471,000 B1 * | 12/2008 | Ruiz | ................ | H02J 7/1415 320/105 |
| 7,560,838 B2 * | 7/2009 | van der Woude | ................ | F02C 7/32 310/64 |
| 7,583,001 B2 * | 9/2009 | Lu | ................ | H02K 1/148 310/67 R |
| 7,653,986 B2 * | 2/2010 | Majernik | ................ | H02K 1/185 29/598 |
| 7,687,952 B2 * | 3/2010 | York | ................ | H02K 1/28 310/263 |
| 7,687,954 B2 * | 3/2010 | Neet | ................ | H02K 19/24 310/263 |
| 7,827,668 B2 * | 11/2010 | McKee | ................ | E21B 17/20 29/515 |
| 7,847,444 B2 * | 12/2010 | Kingman | ................ | H02K 5/203 310/91 |
| 7,868,509 B2 * | 1/2011 | Yoshino | ................ | H02K 1/16 310/216.131 |
| 7,919,898 B2 * | 4/2011 | Wang | ................ | H02K 1/276 310/216.127 |
| 7,928,617 B2 * | 4/2011 | Tsukashima | ................ | H02K 7/20 310/51 |
| 8,138,649 B2 * | 3/2012 | Bradfield | ................ | H02K 21/044 310/156.19 |
| 8,587,165 B2 * | 11/2013 | Zahora | ................ | H02K 9/06 310/58 |
| 8,643,246 B2 * | 2/2014 | Allen | ................ | H02K 1/18 310/216.029 |
| 8,829,743 B2 * | 9/2014 | Watanabe | ................ | H02K 9/19 310/60 A |
| 8,941,282 B2 * | 1/2015 | Allen | ................ | H02K 1/18 310/216.049 |
| 9,136,746 B2 * | 9/2015 | Ikuta | ................ | H02K 1/148 |
| 9,263,921 B2 * | 2/2016 | Tanavde | ................ | H02K 1/16 |
| 9,287,741 B2 * | 3/2016 | Nobata | ................ | H02K 15/14 |
| 9,496,765 B2 * | 11/2016 | Zheng | ................ | H02K 1/185 |
| 9,509,182 B2 * | 11/2016 | Yamarthi | ................ | H02K 1/185 |
| 9,887,600 B2 | 2/2018 | Matsuoka | | |
| 10,075,047 B2 * | 9/2018 | Zhou | ................ | H02K 9/02 |
| 10,177,631 B1 * | 1/2019 | Hopkins | ................ | H02K 5/15 |
| 10,393,082 B2 * | 8/2019 | Ihde | ................ | H02J 7/1415 |
| 10,483,817 B2 * | 11/2019 | Sakurai | ................ | H02K 1/28 |
| 10,840,773 B2 * | 11/2020 | Takano | ................ | H02K 9/227 |
| 10,907,627 B2 * | 2/2021 | Ihde | ................ | F04B 17/03 |
| 11,286,956 B2 * | 3/2022 | Kajikawa | ................ | H02K 7/14 |
| 2001/0038797 A1 * | 11/2001 | Makino | ................ | H02K 7/14 417/410.3 |
| 2003/0184182 A1 * | 10/2003 | Smith, Jr. | ................ | H02K 15/022 310/216.084 |
| 2003/0214197 A1 * | 11/2003 | De Luca | ................ | H02K 1/148 310/216.084 |
| 2004/0217669 A1 * | 11/2004 | Fujii | ................ | H02K 1/148 310/216.045 |
| 2005/0034295 A1 * | 2/2005 | Meacham | ................ | H02K 1/02 29/598 |
| 2006/0049713 A1 | 3/2006 | Toide et al. | | |
| 2006/0071574 A1 * | 4/2006 | Stewart | ................ | H02K 1/146 310/216.132 |
| 2007/0024149 A1 * | 2/2007 | Nagata | ................ | H02K 1/148 310/216.063 |

(56) References Cited

U.S. PATENT DOCUMENTS

| | | | | |
|---|---|---|---|---|
| 2008/0284267 A1* | 11/2008 | Purvines | H02K 16/00 | 310/112 |
| 2009/0289522 A1* | 11/2009 | Buban | H02K 1/148 | 310/216.113 |
| 2010/0021321 A1* | 1/2010 | Koike | F04B 39/0044 | 310/216.136 |
| 2010/0135830 A1* | 6/2010 | Yasuda | H02K 1/146 | 310/216.069 |
| 2010/0308687 A1* | 12/2010 | George | H02K 1/185 | 310/216.135 |
| 2011/0121680 A1* | 5/2011 | Boardman, IV | H02K 1/185 | 310/216.129 |
| 2012/0153749 A1* | 6/2012 | Chun | H02K 1/185 | 310/59 |
| 2012/0161566 A1* | 6/2012 | Ikuta | H02K 1/185 | 310/179 |
| 2013/0089428 A1* | 4/2013 | Hottier | F01D 5/00 | 416/223 R |
| 2013/0106252 A1* | 5/2013 | Yanagida | H02K 11/225 | 310/68 B |
| 2013/0140939 A1* | 6/2013 | Asaga | H02K 15/02 | 29/598 |
| 2013/0187517 A1* | 7/2013 | Asao | H02K 5/04 | 310/68 D |
| 2013/0313922 A1* | 11/2013 | Kim | H02K 3/522 | 310/44 |
| 2014/0197715 A1* | 7/2014 | Roopnarine | H02K 9/02 | 310/216.106 |
| 2014/0231483 A1* | 8/2014 | Takaichi | B26F 3/00 | 225/105 |
| 2014/0265683 A1* | 9/2014 | Hossain | H02K 15/14 | 310/89 |
| 2014/0354107 A1* | 12/2014 | Alfermann | H02K 15/14 | 310/216.113 |
| 2014/0360334 A1* | 12/2014 | Singer-Schnoeller | F16B 7/18 | 29/428 |
| 2015/0000114 A1* | 1/2015 | Matsushita | H02K 15/03 | 29/729 |
| 2015/0022051 A1* | 1/2015 | Meng | B29C 45/0001 | 524/514 |
| 2015/0069865 A1* | 3/2015 | Alfermann | H02K 9/19 | 310/54 |
| 2015/0097469 A1* | 4/2015 | Hugh Sam | H02K 5/24 | 310/431 |
| 2015/0143691 A1* | 5/2015 | Takaichi | H02K 15/03 | 29/738 |
| 2015/0222151 A1* | 8/2015 | Semken | H02K 1/28 | 29/452 |
| 2015/0263582 A1* | 9/2015 | Miyashita | H02K 5/15 | 310/90 |
| 2016/0079817 A1* | 3/2016 | Hayashi | H02K 1/276 | 29/598 |
| 2016/0285324 A1* | 9/2016 | Carrasco | H02K 1/185 | |
| 2016/0285342 A1* | 9/2016 | Carrasco | H02K 15/028 | |
| 2017/0033637 A1 | 2/2017 | Matsuoka | | |
| 2017/0182587 A1* | 6/2017 | Tokoro | B23K 20/123 | |
| 2017/0201135 A1* | 7/2017 | Kai | H02K 3/18 | |
| 2017/0207676 A1* | 7/2017 | Horiuchi | H02K 11/21 | |
| 2017/0313283 A1* | 11/2017 | Kojima | H02K 1/146 | |
| 2017/0317537 A1* | 11/2017 | Horiuchi | H02K 1/165 | |
| 2017/0331336 A1* | 11/2017 | Hayashi | H02K 1/185 | |
| 2018/0043420 A1* | 2/2018 | Handwerker | B23K 20/122 | |
| 2018/0109154 A1* | 4/2018 | Tsuiki | H02K 1/148 | |
| 2018/0248439 A1* | 8/2018 | McGrew, Jr. | H02K 1/185 | |
| 2018/0262068 A1* | 9/2018 | Koshino | H02K 1/185 | |
| 2019/0006894 A1 | 1/2019 | Kobayashi et al. | | |

FOREIGN PATENT DOCUMENTS

| | | |
|---|---|---|
| JP | 2007-151232 A | 6/2007 |
| JP | 4870912 B2 | 2/2012 |
| JP | 5243511 B2 | 7/2013 |
| JP | 2015-89299 A | 5/2015 |
| JP | 2017-11930 A | 1/2017 |
| JP | 6056193 B2 | 1/2017 |
| JP | 2018-64395 A | 4/2018 |
| WO | 2015/115098 A1 | 8/2015 |

OTHER PUBLICATIONS

European Search Report (EESR) dated May 12, 2021 for the corresponding European Patent Application No. 20215129.6.

* cited by examiner

POLYGONAL FRAME STRUCTURE WITH ARMATURE CORE WITH CONNECTED AND OPEN CORE SHEETS INSIDE THE FRAME

CROSS-REFERENCE TO RELATED APPLICATION

This application is based on Japanese Patent Application No. 2019-235835 filed with the Japan Patent Office on Dec. 26, 2019, the entire content of which is hereby incorporated by reference.

BACKGROUND

1. Technical Field

The present disclosure relates to a frame structure of a motor and a method for manufacturing a frame and armature of a motor.

2. Related Art

A synchronous motor including permanent magnets is an example of a motor including magnetic field sources having magnets on a rotor. In the synchronous motor including the permanent magnets, a torque pulsating in accordance with the rotation angle of the rotor, that is, a cogging torque, is generated even in a no-load state by a change in the magnetic resistance of an armature core and a change in the magnetic flux density of the permanent magnet. In terms of the cogging torque, cogging torque resulting from a "design factor" and cogging torque resulting from a "manufacturing factor" are known. The design factor of the former occurs due to, for example, the shape or dimension of the armature core, the permanent magnet of the rotor, or the shape of a rotor core. In a measure to reduce cogging torque in a technology presented in Japanese Patent No. 4870912, the angle of the rotor magnet is set at a certain fixed ratio of pole arc to pole pitch to design a rotor magnet to dimensions with minimum cogging torque. Consequently, cogging torque is reduced.

On the other hand, in terms of the "manufacturing factor" of the latter, cogging torque may increase without exerting the effect of the measure to reduce cogging torque in the design considering the "design factor" of the former, due to, for example, a variation in the dimensions of the armature core itself, a variation in assembly precision, or stress acting during manufacture when a motor is assembled, against which, for example, the following measure is known.

In a technology disclosed in JP-A-2018-64395, a stator includes a frame and a stator core 10 mating with a mating portion of the frame. The stator core 10 is a laminated core including a plurality of iron core laminations 20. The plurality of iron core laminations 20 is fastened together by being interlocked at a plurality of interlocking portions 22 in a laminated state. The plurality of interlocking portions 22 is placed unevenly in the circumferential direction. In the known technology disclosed in JP-A-2018-64395, an almost perfect circular stator core is provided, and an increase in cogging torque is prevented.

Japanese Patent No. 5243511 discloses a method for manufacturing a permanent magnet synchronous motor by fixing a stator core inside a frame. In this method, a specific portion of the frame and a specific portion of the stator core are set as reference positions. Both of the above portions are positioned on the basis of a specific positional relationship and then fixed. The above specific portion of the frame is assumed to be a portion to which a larger force than to the other portion is applied inward at each of N points (N is a natural number) on the outer periphery of the stator core. A pressure member such as a spacer is provided as the specific portion of the frame to which a larger force than to the other portion is applied inward, separately from the frame or the stator core.

The technology disclosed in Japanese Patent No. 5243511 relates to cogging torque in a case of manufacture where the number of poles or slots is completely symmetric. This technology prevents the loss of the symmetry of the number of poles or slots and the appearance of a cogging torque component lower than the degree of the least common multiple of the number in a large amplitude, especially on a mass-production site of actual products.

A rotary electric machine disclosed in Japanese Patent No. 6056193 includes a rotor having permanent magnets, a stator, and a frame member. The stator includes a plurality of substantially T-shaped core piece members. The core piece members are assembled together in such a manner as to have an annular placement that surrounds the rotor in the circumferential direction, and forms an integral structure. The frame member has an inner surface created to be a cylindrical surface. The frame member holds the plurality of core piece members in the annular placement by the inner surface contacting at least some of the plurality of core piece members of the stator. The plurality of core piece members includes standard core piece members and enlarged core piece members. In the standard core piece member, a surface that should contact the inner surface of the frame member is a cylindrical surface element that forms a part of the cylindrical surface with a predetermined radius. In the enlarged core piece member, a surface that should contact the inner surface of the frame member is formed in such a manner as to protrude with respect to the cylindrical surface element of the standard core piece member. In the stator, the enlarged core piece members are placed at circumferential positions of the annular placement corresponding to positions on an outer side than an ideal cylindrical surface among positions on the inner surface of the frame member.

The technology disclosed in Japanese Patent No. 6056193 is a technology for solving the following point: in other words, in a stator being an assembly of a plurality of core pieces, the roundness of an inner surface decreases. If the roundness decreases, the shape of a gap between the stator and a rotor becomes uneven. Accordingly, the circumferential distribution of magnetic energy becomes unbalanced. The magnetic unbalance causes a component that pulsates the number of times equal to the number of magnetic poles per rotation of the rotor (what is called a pole-number component) to be superimposed on the waveform of torque variation (cogging torque) of the rotor including permanent magnets. As a result, the peak-to-peak value (peak to peak value) of the cogging torque increases.

What is common to the technologies of these documents is the point that the shape of a mating portion is devised in such a manner as to tighten the portion unevenly to achieve a perfect circle by applying stress from the outside of the frame. However, it is not easy to obtain an ideal perfect circular shape for the inner surface of the stator, depending on the precision of the mating portion, or the manner of application of stress.

SUMMARY

A frame structure of a motor includes: a frame including a polygonal outer periphery, and a circular inner periphery;

and an armature core to be inserted into the inner periphery of the frame, in which the armature core includes a plurality of first core sheets stacked on top of each other, or a plurality of the first core sheets and second core sheets, which are stacked on top of each other, in the first core sheet, distal end portions of adjacent magnetic poles on a rotation axis side of the frame are coupled by bridges, in the second core sheet, openings are formed between the distal end portions of the adjacent magnetic poles on the rotation axis side without coupling the distal end portions, the number of angles of the polygon of the outer periphery of the frame is defined on the basis of the number of peaks of the thickness of the frame in cross section as viewed in a radial direction from the rotation axis of the frame, and the armature core is inserted into the frame in such a manner as to form a variation θ within a predetermined range in a circumferential direction between a reference line that is orthogonal to two opposing sides of the frame and passes through the rotation axis, and a straight line linking magnetic poles symmetric about a point with respect to the rotation axis, assuming that the number of angles of the frame is 4M where M is a natural number and M≥1, and the number of slots of the armature core is 6N where N is a natural number and N≥1.

DETAILED DESCRIPTION

Figure 1A:
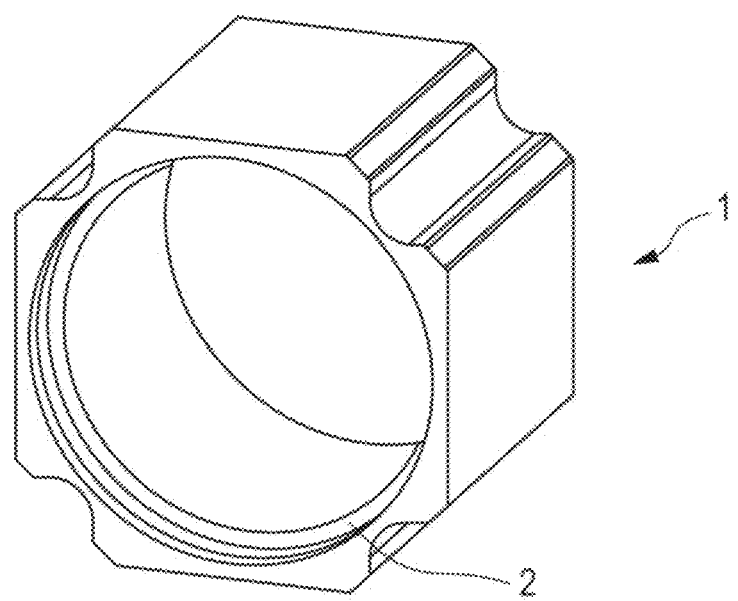
FIG. 1A is an image perspective view of a frame structure for explaining a basic idea of a technology of the embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One object of the present disclosure is to enable dispersing uneven stress received from a frame, obtaining a more ideal perfect circular shape for an inner peripheral surface of an armature core of a stator, and/or reducing a "manufacturing factor" being one of factors of occurrence of cogging torque, in a method different from the prior arts.

A frame structure of a motor according to an aspect of the present disclosure is as follows:

That is, a frame structure of a motor according to an embodiment of the present disclosure includes: a frame including a polygonal outer periphery, and a circular inner periphery; and an armature core to be inserted into the inner periphery of the frame, in which the armature core includes a plurality of first core sheets stacked on top of each other, or a plurality of the first core sheets and second core sheets, which are stacked on top of each other, in the first core sheet, distal end portions of adjacent magnetic poles (MP) on a rotation axis (Z) side of the frame are coupled by bridges, in the second core sheet, openings (CL) are formed between the distal end portions of the adjacent magnetic poles on the rotation axis side without coupling the distal end portions, the number of angles of the polygon of the outer periphery of the frame is defined on the basis of the number of peaks of the thickness of the frame in cross section as viewed in a radial direction from the rotation axis of the frame, and the armature core is inserted into the frame in such a manner as to form a variation θ within a predetermined range in a circumferential direction between a reference line (X1, Y1) that is orthogonal to two opposing sides of the frame and passes through the rotation axis, and a straight line (X2, Y2) linking magnetic poles symmetric about a point with respect to the rotation axis, assuming that the number of angles of the frame is 4M where M is a natural number and M≥1, and the number of slots of the armature core is 6N where N is a natural number and N≥1.

Further, a frame structure of a motor according to another embodiment of the present disclosure includes: a frame including a polygonal outer periphery, and a circular inner periphery; and an armature core to be inserted into the inner periphery of the frame, in which the armature core includes stacked second core sheets of an integral structure where all magnetic poles are connected in a circumferential direction of the second core sheet, or stacked third core sheets of a T-shape where all the magnetic poles are separated in a circumferential direction of the third core sheet, a predetermined number of the stacked third core sheets being combined at equal intervals to be assembled together in a concentric circular form having opening between distal end portions of the magnetic poles, the number of angles of the polygon of the outer periphery of the frame is defined on the basis of the number of peaks of the thickness of the frame in cross section as viewed in a radial direction from a rotation axis of the frame, and the armature core is inserted into the frame in such a manner as to form a variation θ within a predetermined range in the circumferential direction between a reference line that is orthogonal to two opposing sides of the frame and passes through the rotation axis, and a straight line linking the magnetic poles symmetric about a point with respect to the rotation axis, assuming that the number of angles of the frame is 4M where M is a natural number and M≥1, and the number of slots of the armature core is 6N where N is a natural number and N≥1.

In addition, the following method for manufacturing a frame and armature of a motor is employed to configure such a frame structure of a motor as described above.

That is, a method for manufacturing a frame and armature of a motor according to an embodiment of the present disclosure includes forming an armature core to be inserted into an inner periphery of a frame including a polygonal outer periphery and the circular inner periphery by stacking a plurality of first core sheets on top of each other, or stacking the first core sheets and second core sheets alternately, in which in the first core sheet, distal end portions of adjacent magnetic poles on a rotation axis side of the frame are coupled by bridges, in the second core sheet, openings are formed between the distal end portions of the adjacent magnetic poles on the rotation axis side without coupling the distal end portions, the method further includes inserting the armature core into the frame by use of a position determiner in such a manner as to form a variation θ within a predetermined range in a circumferential direction between a reference line that is orthogonal to two opposing sides of the frame and passes through the rotation axis, and a straight line linking the magnetic poles symmetric about a point with respect to the rotation axis, assuming that the number of angles of the polygon of the outer periphery of the frame is 4M where M is a natural number and M≥2, and the number of slots of the armature core is 6N where N is a natural number and N≥2), and the number of angles of the frame is defined on the basis of the number of peaks of the thickness of the frame in cross section as viewed in a radial direction from the rotation axis of the frame.

Further, a method for manufacturing a frame and armature of a motor according to another embodiment of the present disclosure includes: forming an armature core to be inserted into an inner periphery of a frame including a polygonal outer periphery and the circular inner periphery by stacking second core sheets of an integral structure where all magnetic poles are connected in a circumferential direction of the second core sheet, or stacking third core sheets of a T-shape where all the magnetic poles are separated in a circumferential direction of the third core sheet and a predetermined number of the stacked third core sheets are combined at equal intervals to assemble the third core sheets together in a concentric circular form having openings between distal end portions of the magnetic poles; and inserting the armature core into the frame by use of a position determiner in such a manner as to form a variation θ within a predetermined range in the circumferential direction between a reference line that is orthogonal to two opposing sides of the frame and passes through the rotation axis, and a straight line linking the magnetic poles symmetric about a point with respect to the rotation axis, assuming that the number of angles of the polygon of the outer periphery of the frame is 4M where M is a natural number and M≥1, and the number of slots of the armature core is 6N where N is a natural number and N≥2, in which the number of angles of the frame is defined on the basis of the number of peaks of the thickness of the frame in cross section as viewed in a radial direction from a rotation axis of the frame.

In the above aspect of the present disclosure, it is possible to disperse uneven stress received from the frame. Hence, it is possible to obtain a more ideal perfect circular shape for an inner peripheral surface of a stator. Therefore, it is possible to manufacture the frame structure in such a manner as to stabilize cogging torque. In other words, in the above aspect, it is possible to obtain an effect that a "manufacturing factor" being one of factors of occurrence of cogging torque can be reduced.

Figure 1B:
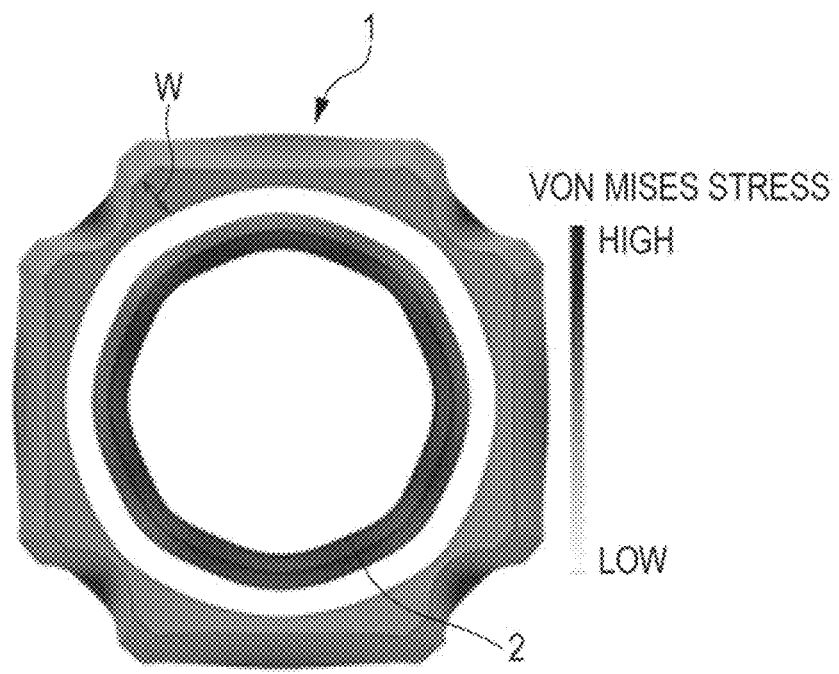
FIG. 1B is a stress deformation image cross-sectional view illustrating a von Mises stress distribution and deformed state thereof.

Firstly, a basic idea of the embodiment is described. The embodiment relates to a frame structure of a motor including magnetic field sources having magnets on a rotor. In the following description, the configuration and function of a motor including magnetic field sources having magnets on a rotor are publicly known. Accordingly, a detailed description thereof is omitted, except parts related to the embodiment. FIG. 1A illustrates an image perspective view of the frame structure for explaining the basic idea of the embodiment. FIG. 1B illustrates a stress deformation image cross-sectional view illustrating a von Mises stress distribution and deformed state thereof.

In this aspect, basically a frame 1 is geometrically square as illustrated in FIG. 1A. Two thick corner portions with a thickness Ware formed at each vertex portion of the square. Consequently, the frame 1 has eight angles. An annular ring 2 is provided on an inner side of the frame 1. The annular ring 2 is an outer peripheral surface of a modeled armature core AC (refer to FIG. 3), that is, a portion, which is located on an inner peripheral side of the frame 1, of the armature core AC. In the frame 1 of the aspect, given that the number of angles of the frame 1 is a 4M-gon (M is a natural number), M=2. In this manner, the frame 1 has a polygonal (octagonal) outer periphery and a circular inner periphery.

The armature core AC is inserted into the frame 1 (the inner periphery of the frame 1). When torque T occurs on a motor M, some kind of coupling is provided between the frame 1 and the armature core AC to prevent the armature core AC from rotating in a direction opposite to the torque T due to a reaction force. Roughly the following two methods are generally employed: In the first method, the outside diameter of the armature core AC and the inside diameter of the frame 1 are set to press-fit dimensions. The armature core AC is mechanically shrunk and fixed in the frame 1 by, for example, shrinkage fit. In the second method, the outside diameter of the armature core AC is made smaller than the inside diameter of the frame 1 to provide a gap between the frame 1 and the armature core AC. The frame 1 and the armature core AC are then fixed with an adhesive. A method of a combination of the two methods may be employed. In the first method, stress due to the shrinkage of the frame acts in a radial direction from the outside diameter of the core. In the second method, stress due to the cure shrinkage of the adhesive acts in the radial direction from the outside diameter of the core. However, uneven magnetic distribution occurs due to stress for coupling from the frame. This leads to a factor of a manufacturing error related to an increase in cogging torque Tc against the intention of design. Hence, it is desirable to reduce stress acting on the armature core AC to a minimum.

The stress deformation changes depending on the magnitude of the thickness W between the outer and inner peripheries of the frame 1. If the inner and outer peripheries of the frame 1 have a circular shape (not illustrated), the stress on the armature core AC received from the frame acts on the armature core AC substantially evenly. However, if the frame 1 is polygonal as in the aspect, stress acting on the inside differs between the vertices, sides, and other portions of the frame 1. Hence, uneven stress acts on each magnetic pole MP of the armature core AC. In terms of how uneven stress from the frame 1 acts on the armature core AC, a stress analysis was carried out, assuming a case where the simple annular ring 2 was inserted by press fitting into such a frame 1 as illustrated in FIG. 1A. FIG. 1B illustrates the analysis result. FIG. 1B illustrates an image of stress deformation given by the frame 1 to the annular ring 2 in a von Mises stress distribution form in the aspect.

Various materials such as iron and aluminum are used as the material of the frame 1. The material of the armature core AC is generally an iron-based metal such as a magnetic steel sheet. In the analysis related to FIG. 1B, both members were set to have the same material to illustrate a deformed state in an easy-to-understand manner.

As in FIG. 1B, the annular ring 2 was deformed into a polygon in such a manner that a portion corresponding to the portion, which had the high thickness W, of the frame 1 was recessed and a portion corresponding to the portion, which had the low thickness W, of the frame 1 protruded. It can be seen from FIG. 1B that stress deformation generally changes according to the magnitude of the thickness W between the outer and inner peripheries of the frame 1.

Therefore, it is preferable in a decision about the frame structure to define the number of angles of the polygonal shape of the frame on the basis of the relationship with the thickness W. In other words, the number of angles of the polygon is defined, using the number of peaks of the thickness W of the frame 1 in cross section as viewed in the radial direction from a rotation axis Z of the frame 1.

Figure 2:
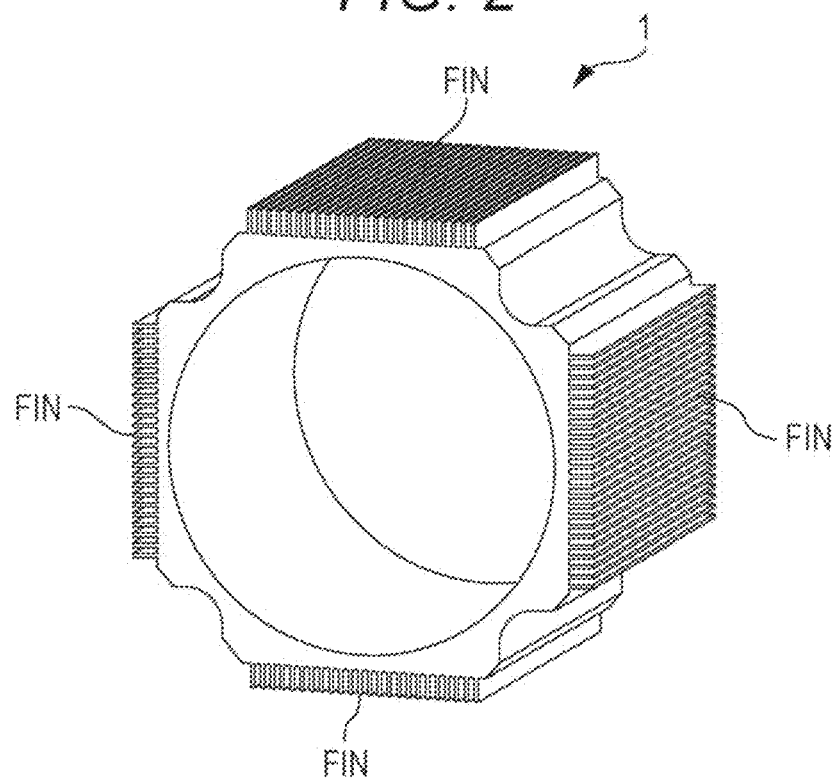
FIG. 2 is an image perspective view of an aspect where an additional configuration is provided to the frame structure of the embodiment.

FIG. 2 illustrates an image perspective view of an aspect where an additional configuration is provided to the frame structure of the embodiment. In this aspect, a heat dissipation fin Fin for dissipating the heat generated by the motor M to, for example, the outside air is provided on an outer peripheral side of the frame 1. Such a heat dissipation fin Fin being the additional configuration to the frame 1 is not a structural member and is not a component part that has a large influence on the uneven stress acting on each magnetic pole MP of the armature core AC from the frame 1. Hence, in such an aspect, design is performed on the basis of, for example, the shape of a main body portion of the frame 1, which is a portion excluding the heat dissipation fin Fin being the additional configuration.

The above consideration reveals the following basic idea to design the frame structure: in other words, the armature core AC deforms from the outer periphery under stress from the frame 1. Hence, the armature core AC is inserted into the frame 1 in such a manner as to provide a fixed angle with respect to the Z-axis vertical to a cross section, the Z-axis passing through the center of the frame 1 and the armature core AC, to reduce the deformation as much as possible. Consequently, it is possible to disperse the stress acting on the armature core AC from the radial direction. Accordingly, it is possible to ease stress due to the uneven stress on the armature core AC.

In terms of the shape of the armature core AC that is inserted into the inside, there are aspects where distal end portions of the magnetic poles MP are and are not bridged and coupled. The distribution of stress is significantly different between these aspects. When the frame structure is designed on the basis of the above basic idea, the optimum insertion angle is determined according to the aspect, considering these two aspects.

These aspects are described below as a first aspect and a second aspect of the embodiment.

Figure 3:
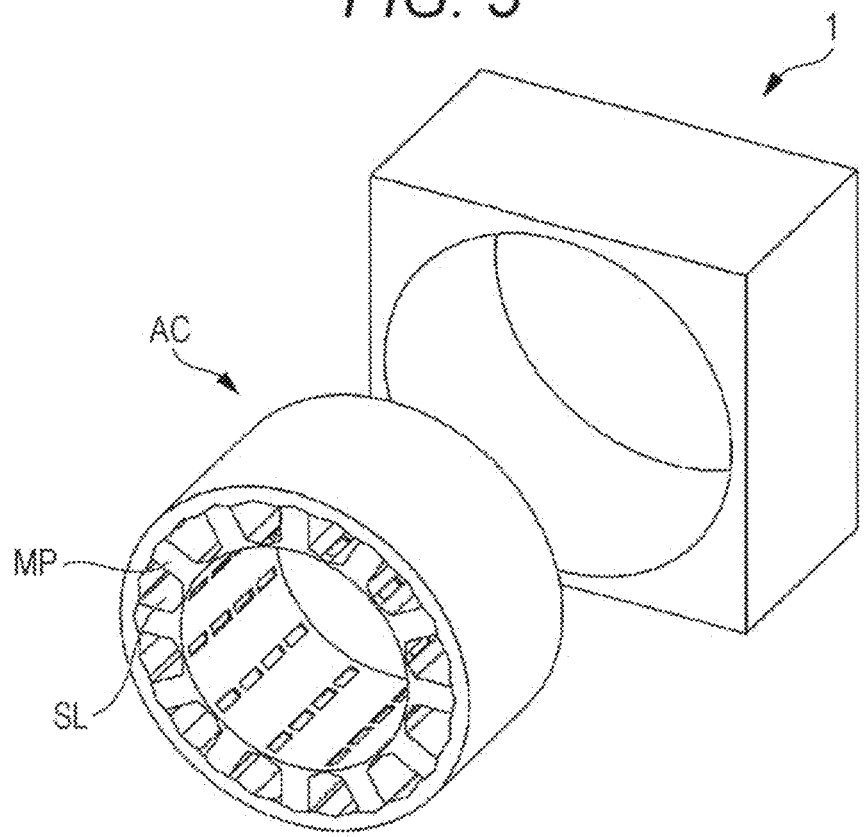
FIG. 3 is a perspective view illustrating a disassembled frame structure according to a first aspect of the embodiment.

FIG. 3 is a perspective view illustrating a disassembled frame structure according to the first aspect of the embodiment.

In this aspect, first core sheets where the distal end portions of the adjacent magnetic poles MP are coupled by the bridges, and second core sheets where the distal end portions of the adjacent magnetic poles MP include at least one or more kinds of openings CL are mixed and stacked in the armature core AC to be inserted into the frame 1. Naturally, only the first core sheets where the distal end portions of the adjacent magnetic poles MP of the armature core AC are coupled by the bridges may be stacked in the armature core AC.

In other words, in the first core sheet, the distal end portions of the adjacent magnetic poles MP on the rotation axis Z side are coupled by the bridges. Moreover, in the second core sheet, the opening CL are formed between the distal end portions of the adjacent magnetic poles on the rotation axis Z side without coupling the distal end portions. The armature core AC may include a plurality of the first core sheets stacked on top of each other, or a plurality of the first core sheets and the second core sheets, which are stacked on top of each other.

In other words, the armature core may be formed by staking a plurality of the first core sheets on top of each other, or by stacking the first core sheets and the second core sheets on top of each other.

The outer periphery of the frame 1 is square. The frame 1 is an example of an aspect of a 4M-gon (M: natural number) where M=1.

Figure 4:
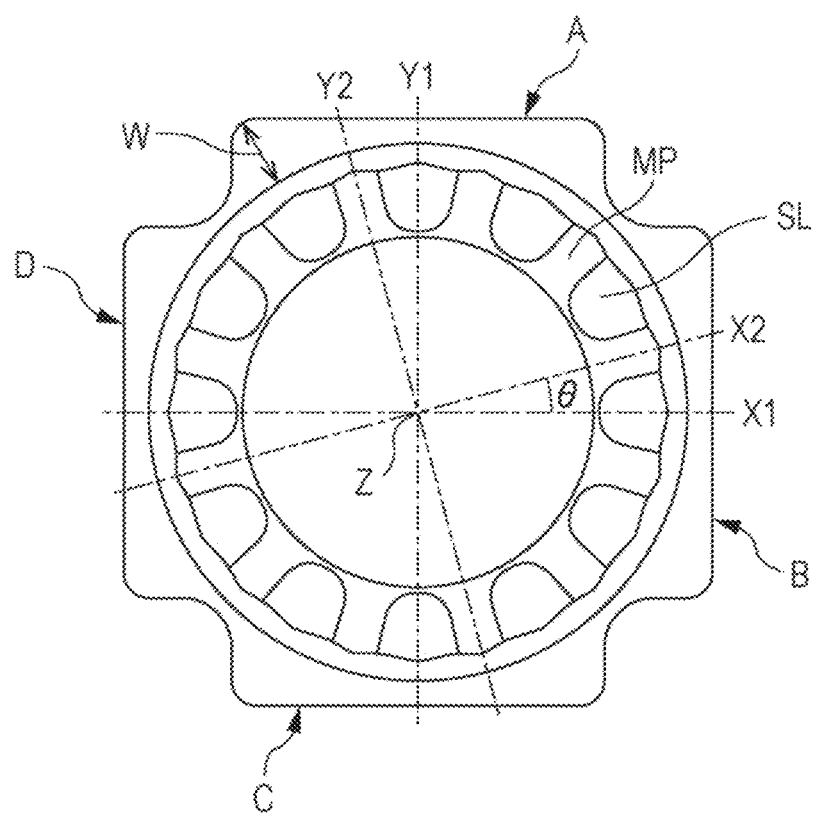
FIG. 4 is an explanatory diagram of the insertion angle (a variation θ) of an armature core according to the first aspect of the embodiment.

FIG. 4 is an explanatory diagram of the insertion angle of the armature core AC with respect to the frame 1 according to the aspect.

The insertion angle is set as a variation θ1 within a predetermined range in the circumferential direction. The variation θ1 is caused between two reference lines X1 and Y1 that are orthogonal to two opposing sides (two pairs of A and C, and B and D) of the outer periphery of the frame 1, and pass through the rotation axis Z of the motor, and straight lines X2 and Y2 linking the magnetic poles MP symmetric about a point with respect to the rotation axis Z (or specifically, straight lines close to the reference lines X1 and Y1).

A pitch of the magnetic pole MP appears in the same period as the number of slots SL within a rotation angle of 360° being the entire peripheral distance. If a variation exceeding a half of the pitch is employed, the positional relationship is reproduced from the relationship between the magnetic pole MP and the slot SL adjacent to the magnetic pole MP. Accordingly, the variation range exceeds 0°. Therefore, it is sufficient if a region up to a half of the pitch of the magnetic pole MP is considered.

In the aspect, the number of angles of the frame 1 is eight, which is a 4M-gon (M: natural number) where M=2. The number of the magnetic poles MP of the armature core AC, that is, the number of the slots SL, is 12. In terms of the number of the slots SL, or 6N, N=2.

In this manner, given that the number of angles of the frame 1 is 4M (M is a natural number, and M≥1 or M≥2), and the number of the slots SL of the armature core AC is 6N (N is a natural number, and N≥1 or N≥2), the armature core AC is inserted into the frame 1 by use of, for example, a position determiner in such a manner that the variation θ (θ1) within the predetermined range in the circumferential direction is formed between the reference lines X1 and Y1 that are orthogonal to two opposing sides of the frame 1 and pass through the rotation axis Z, and the straight lines X2 and Y2 that link the magnetic poles MP symmetric about a point with respect to the rotation axis Z.

In this case, the pitch of the magnetic pole MP is 30 obtained by dividing a rotation angle of 360° being the entire peripheral distance by the number of the slots SL, 12. Hence, the above-mentioned region of the variation θ1 that should be considered is from 0° to 15° being a half of the pitch.

In terms of the variation θ1, a structural analysis was carried out for an aspect where θ1=7.5°. The results are illustrated in FIGS. 5A and 5B.

Figure 5A:
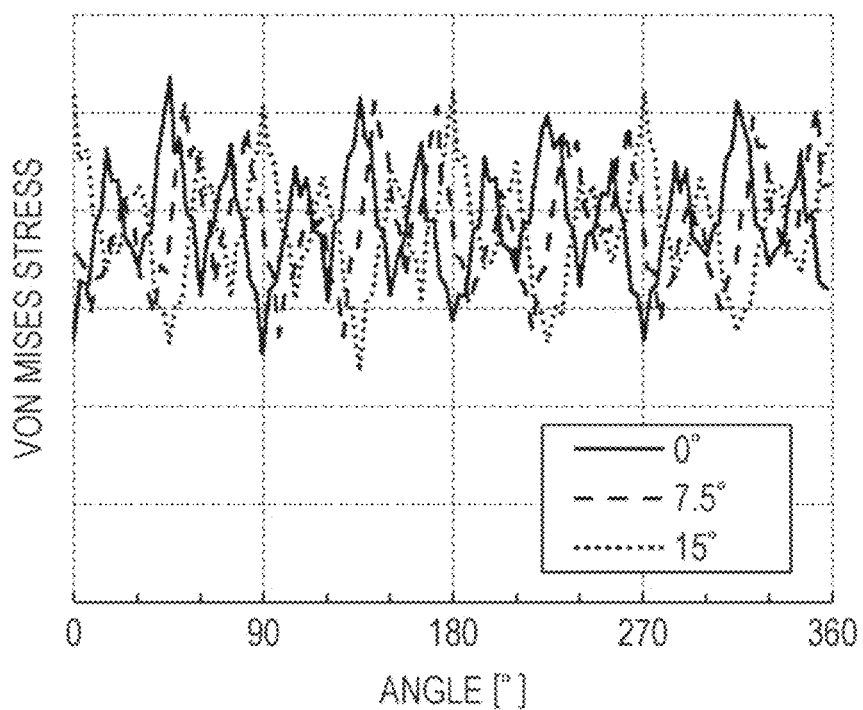
FIG. 5A is a graph illustrating the distribution of stress acting on the inner periphery of the armature core according to the first aspect of the embodiment.

FIG. 5A illustrates the distribution of stress acting on the inner periphery of the armature core AC according to the aspect. In terms of stress on any cross section including the distal end and bridge of the magnetic pole MP, the horizontal axis represents the circumferential angle (0 to 360°), and the vertical axis represents the von Mises stress at each angle. Furthermore, it is possible to evaluate amplitude components included in the von Mises stress by carrying out Fourier analysis on the spatial distribution of the stress. FIG. 5B illustrates the amplitude components included in the von Mises stress.

Figure 5B:
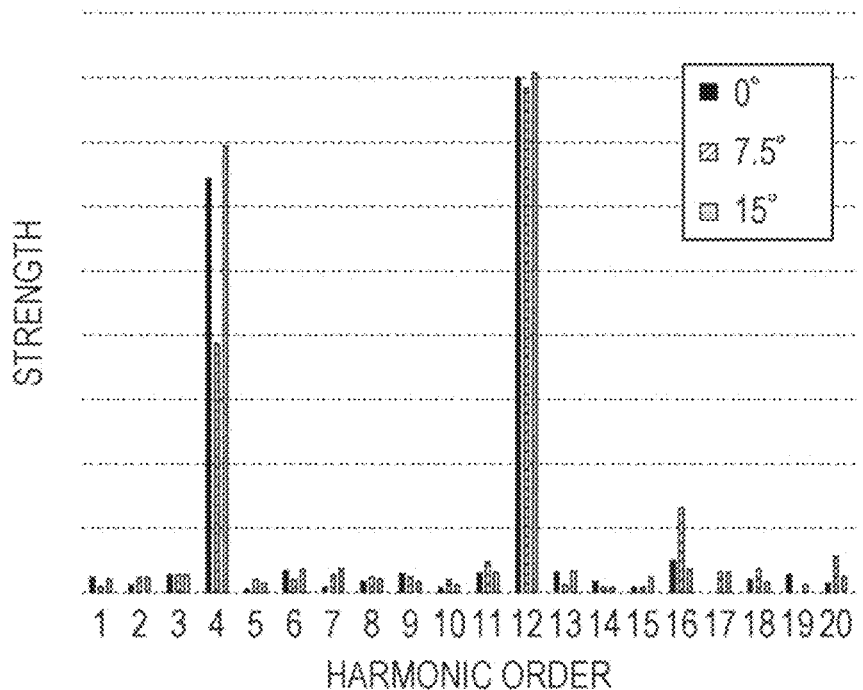
FIG. 5B is a graph illustrating amplitude components included in the von Mises stress according to the first aspect of the embodiment.

As is clear from FIG. 5B, it can be seen that when θ1=7.5°, a stress component of the fourth harmonic is minimum. In this state, deformation stress acts from the outer periphery of the octangular frame 1. Furthermore, in this state, the slots SL are located immediately below the vertices or the sides A to D of the outer periphery of the frame.

A lower-order harmonic generally has a higher degree of contribution to a manufacturing error factor of the cogging torque Tc, which indicates that in this case, the aspect where the variation θ1=7.5° is an aspect where the manufacturing stability in terms of the cogging torque Tc is the highest.

Figure 6:
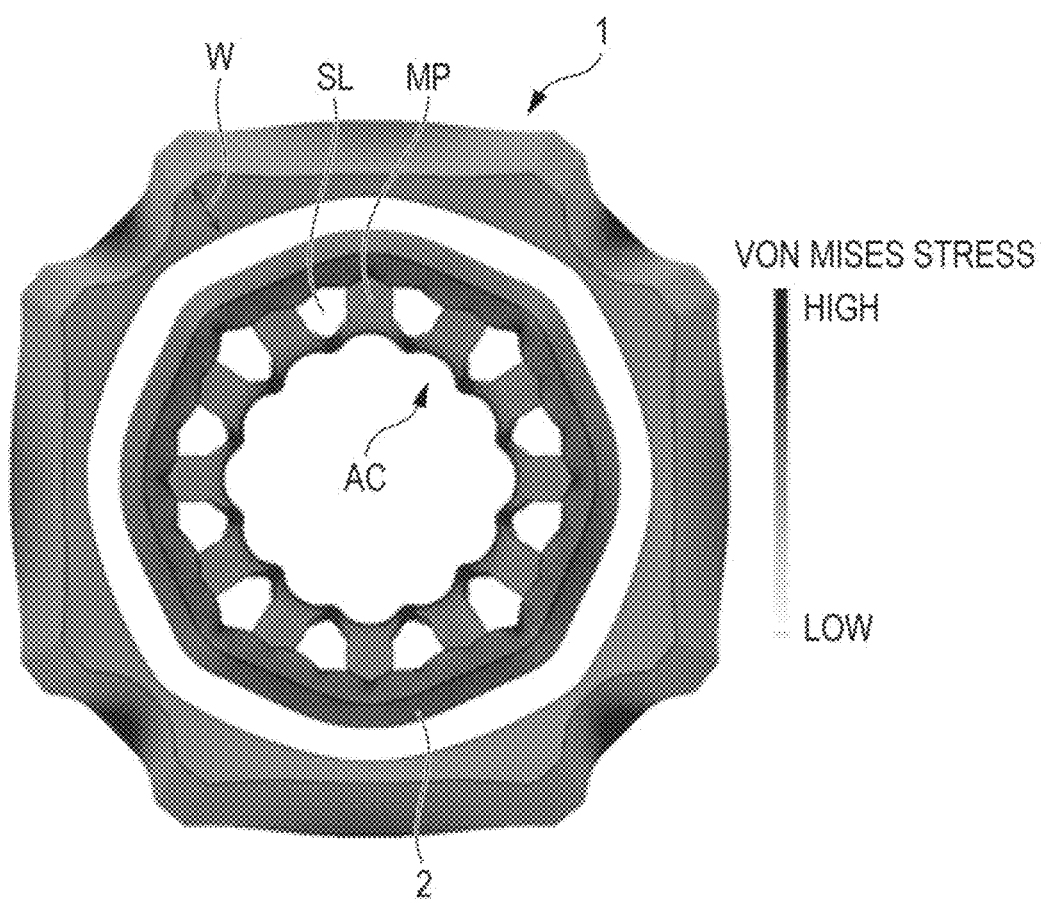
FIG. 6 is a stress deformation cross-sectional view illustrating the von Mises stress distribution and a deformed state in an aspect where the variation θ is 0°, as a comparative example of the first aspect of the embodiment.

FIG. 6 illustrates an aspect where the variation θ1=0° as a comparative example. In this comparative example, the magnetic pole MP is located immediately below each of the sides A to D of the frame 1, or each vertex of the polygonal frame 1. It can be seen from this comparative example that the armature core AC including the magnetic poles MP and the bridges inside the frame 1 is to be deformed into an octagon.

Figure 7A:
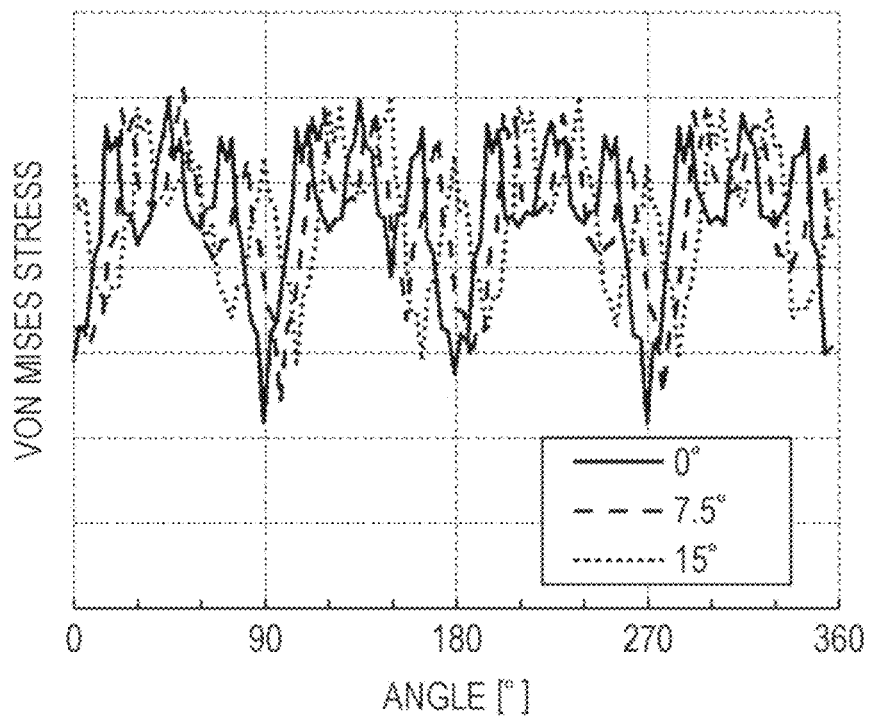
FIG. 7A is a graph illustrating another distribution of stress acting on the inner periphery of the armature core according to the first aspect of the embodiment.
Figure 7B:
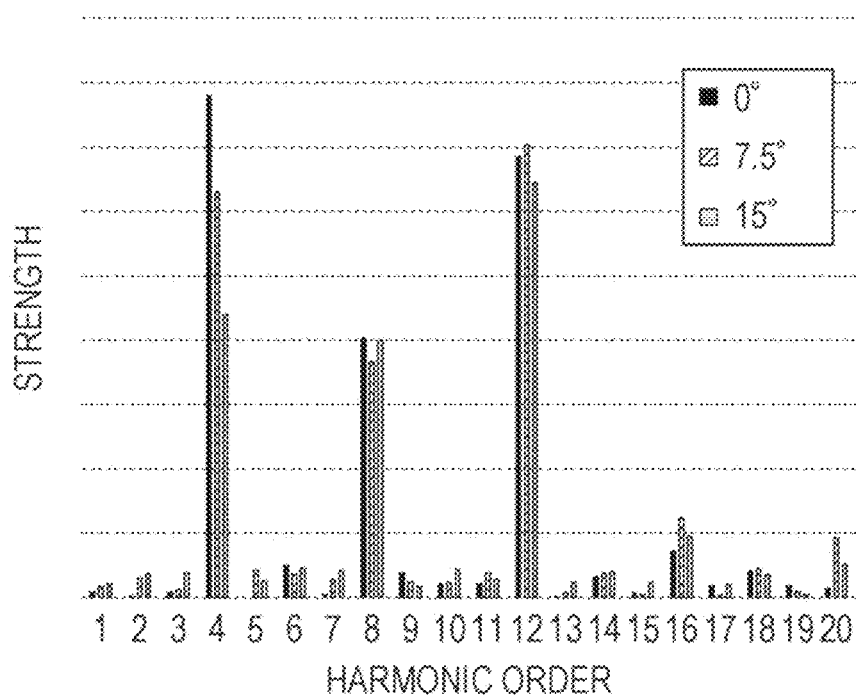
FIG. 7B is a graph illustrating other amplitude components included in the von Mises stress according to the first aspect of the embodiment.

FIGS. 7A and 7B illustrate the distribution of the von Mises stress acting on the inner periphery of the armature core AC, and amplitude components included in the von Mises stress, respectively. In the armature core AC of the aspect related to these drawings, the number of angles, 4M, of the frame 1 is set at M=1, that is, four angles, and the number of the slots SL, 6N, is set at N=2, that is, 12.

In the armature core AC of the aspect illustrated in FIGS. 5A, 5B, and 6, the number of angles, 4M, of the frame 1 is set at M=2, that is, eight angles, and the number of the slots SL, 6N, is set at N=2, that is, 12. In a case of this aspect, the variation θ1=7.5° is the most suitable. On the other hand, it can be seen from FIGS. 7A and 7B that even if the number of the slots SL is the same, when the number of angles 4M of the frame 1 is M=1, that is, four angles, the variation θ1=15° is effective to reduce low-order harmonics.

Figure 8A:
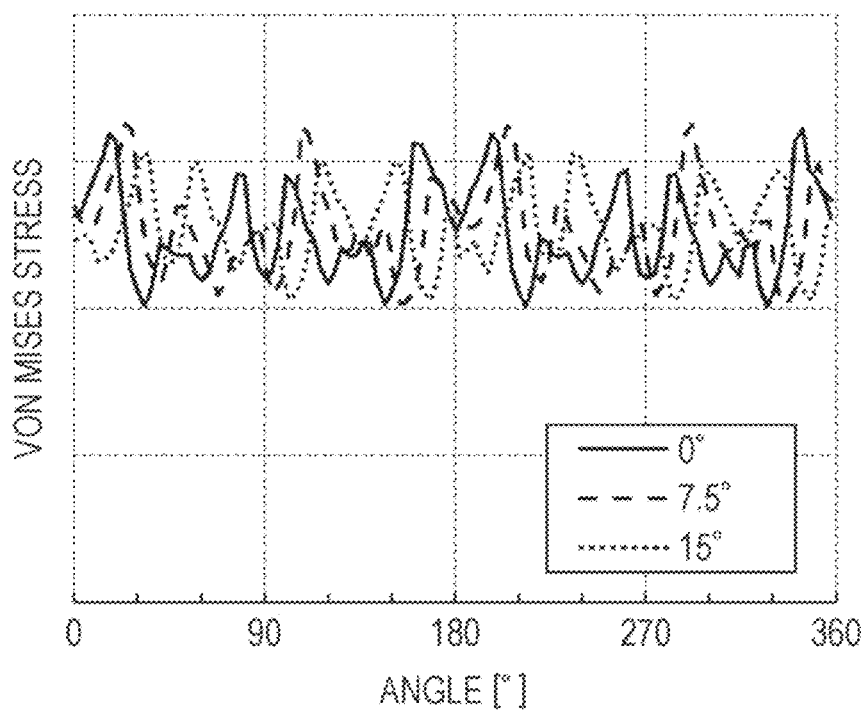
FIG. 8A is a graph illustrating still another distribution of stress acting on the inner periphery of the armature core according to the first aspect of the embodiment.
Figure 8B:
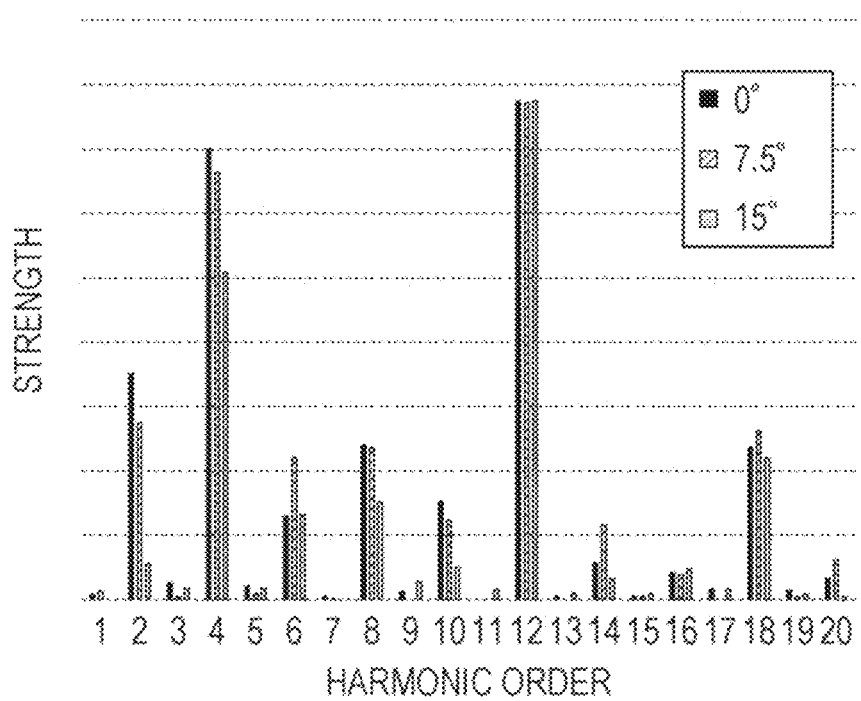
FIG. 8B is a graph illustrating still other amplitude components included in the von Mises stress according to the first aspect of the embodiment.

FIGS. 8A and 8B illustrate the distribution of the von Mises stress acting on the inner periphery of the armature core AC, and amplitude components included in the von Mises stress, respectively. In the armature core AC of an aspect related to these drawings, the number of angles 4M of the frame 1 is set at M=2, that is, eight angles, and the number of the slots SL 6N is set at N=1, that is, six.

It can be seen from the drawings that in this aspect, many harmonics are observed from low to high orders, and the variation θ1=150 is the most dominant, that is, the most suitable in a low-order harmonic region.

Figure 9A:
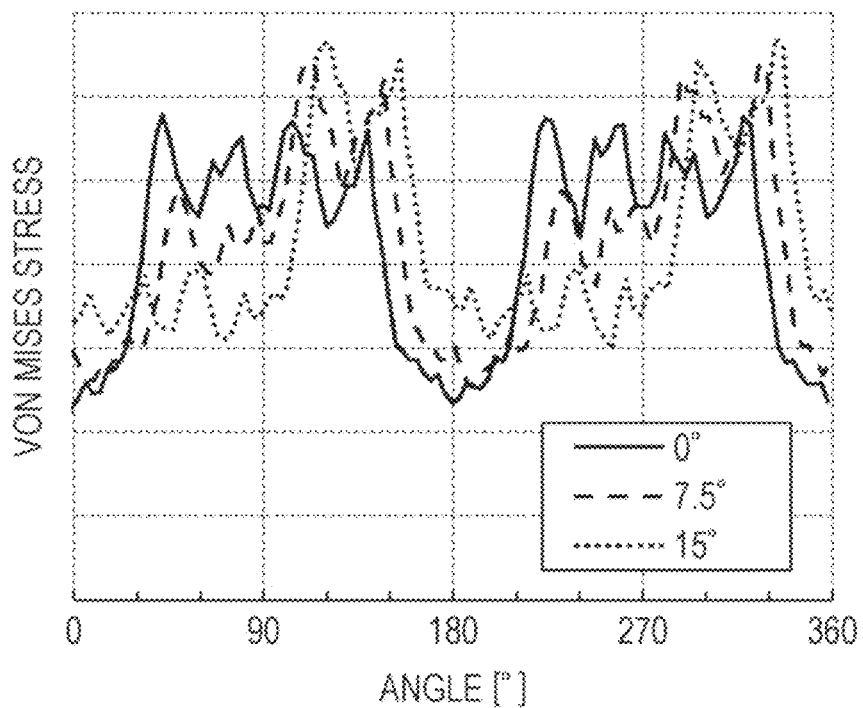
FIG. 9A is a graph illustrating yet another distribution of stress acting on the inner periphery of the armature core according to the first aspect of the embodiment.
Figure 9B:
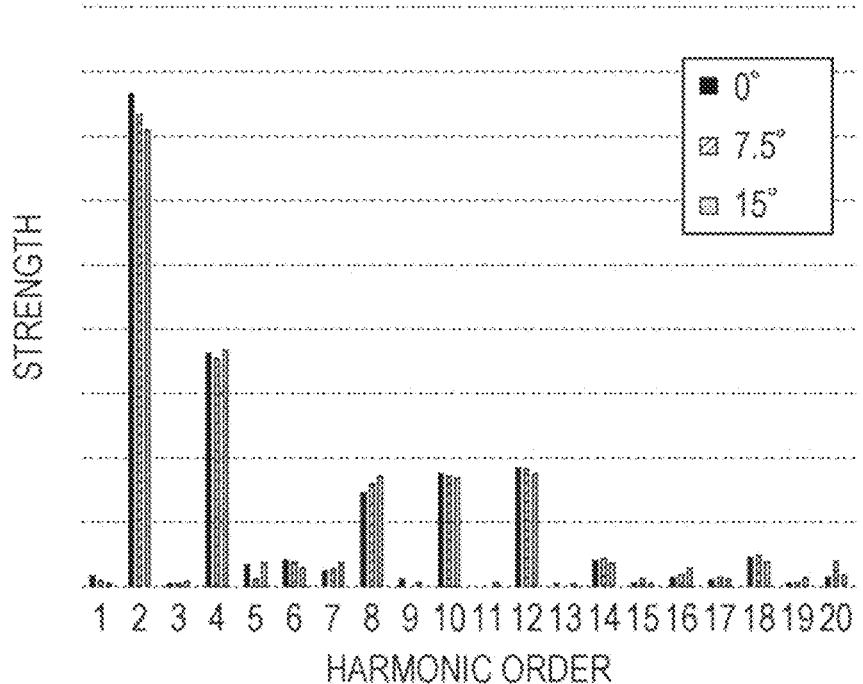
FIG. 9B is a graph illustrating yet other amplitude components included in the von Mises stress according to the first aspect of the embodiment.

FIGS. 9A and 9B illustrate the distribution of the von Mises stress acting on the inner periphery of the armature core AC, and amplitude components included in the von Mises stress, respectively. In the armature core AC of an aspect related to these drawings, the number of angles 4M of the frame 1 is set at M=1, that is, four angles, and the number of the slots SL 6N is set at N=1, that is, six.

It can be seen from the drawings that in this aspect, harmonics are concentrated in the low-order harmonic region, and the variation θ1=15° is slightly dominant.

However, in the aspect, stress components of the second and the fourth harmonic of deformation components appearing in low-order harmonics hardly change. Therefore, it is difficult to significantly increase the manufacturing stability in terms of the cogging torque Tc.

Figure 10:
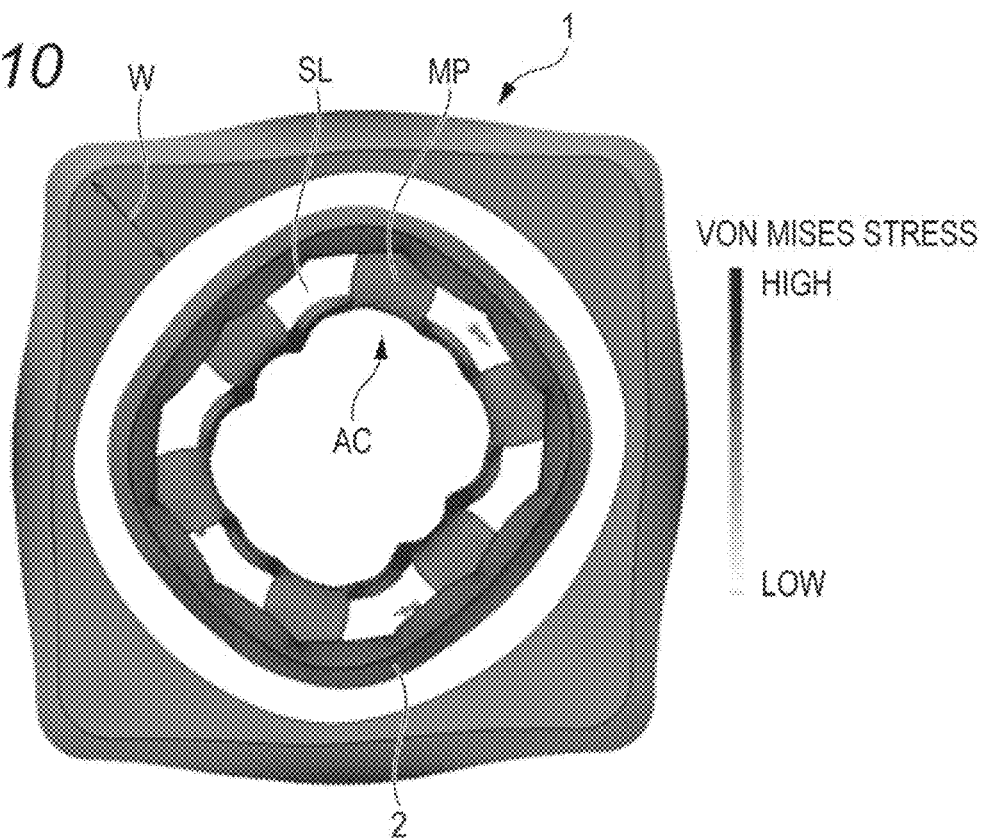
FIG. 10 is a stress deformation cross-sectional view illustrating a von Mises stress distribution and a deformed state in an aspect where the variation θ is 15°, as a comparative example of the first aspect of the embodiment.

FIG. 10 illustrates a stress deformation cross-sectional view illustrating a von Mises stress distribution and a deformed state when θ1=150 in the aspect.

As can be seen from FIG. 10, the armature core AC was deformed into a substantial square, which indicates that the uneven stress from the frame was not dispersed. Since the number of the slots SL is six, the pitch of the magnetic pole MP is 60°. Hence, 0°<θ1≤300 in a region of the variation θ1. However, in reality, the same positional relationship as the positional relationship of the magnetic pole MP occurring in a region of $0°<\theta1\leq15°$ is reproduced in a region of $15°<\theta1\leq30°$. The embodiment can also be applied to this case.

Figure 11:
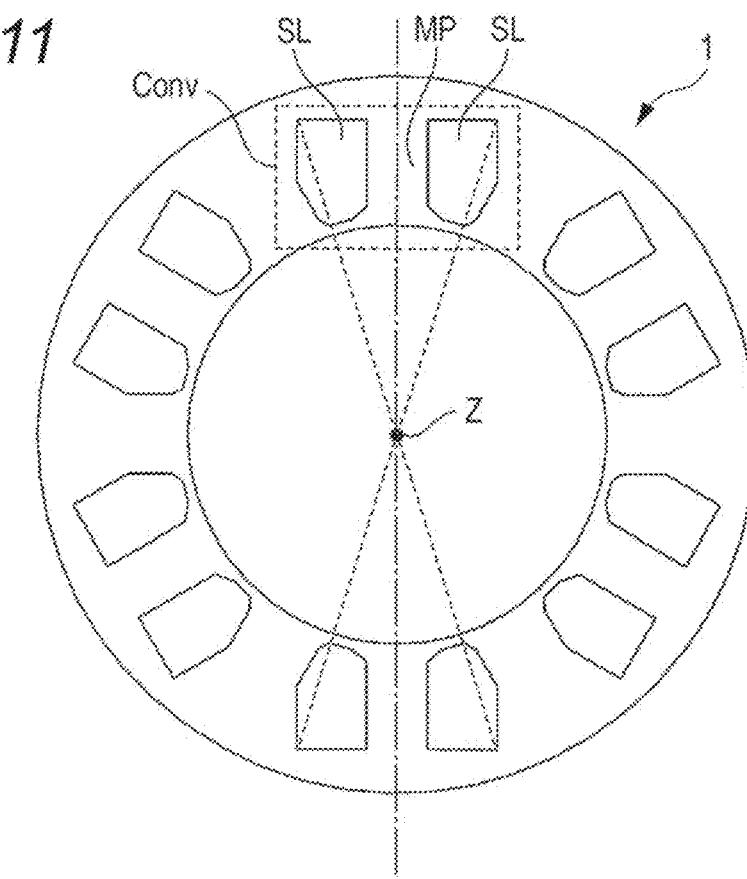
FIG. 11 is a cross-sectional view illustrating an aspect where the armature core of the frame structure is asymmetric about a point according to the first aspect of the embodiment.

In a structure of an aspect illustrated in FIG. 11, the armature core AC is asymmetric about a point. In this aspect, the adjacent slots SL (combined Conv surrounded by a dotted line in FIG. 11) are placed in such a manner as to be symmetric about a line with respect to the magnetic pole MP placed therebetween. On the other hand, the armature core AC is asymmetric about a point when viewed from the center of the slot SL.

Figure 12A:
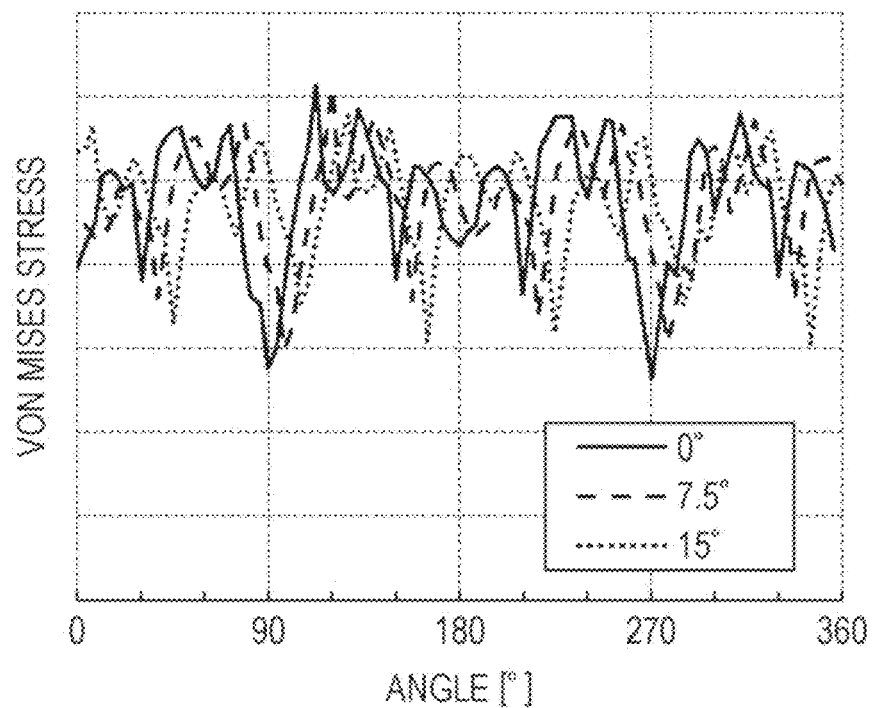
FIG. 12A is a graph illustrating the distribution of stress acting on the inner periphery of the armature core in an aspect where the armature core of the frame structure is asymmetric about a point, according to the first aspect of the embodiment.
Figure 12B:
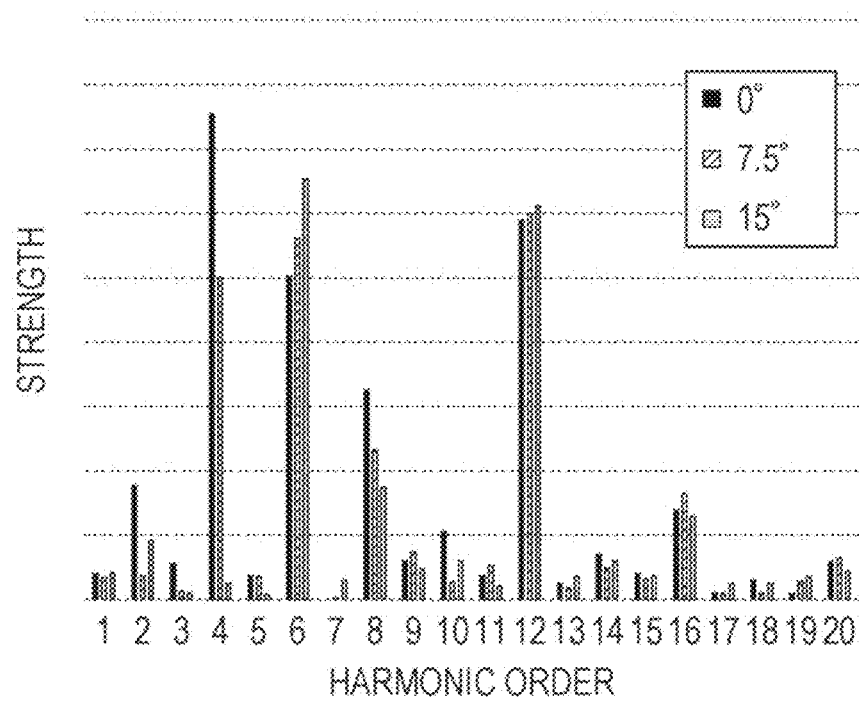
FIG. 12B is a graph illustrating amplitude components included in the von Mises stress in an aspect where the armature core of the frame structure is asymmetric about a point, according to the first aspect of the embodiment.

FIGS. 12A and 12B illustrate the distribution of the von Mises stress acting on the inner periphery of the armature core AC, and amplitude components included in the von Mises stress, respectively, in terms of such a structure of the armature core AC asymmetric about a point. In the armature core AC of the aspect related to these drawings, the number of angles 4M of the frame 1 is set at M=2, that is, eight angles, and the number of the slots SL 6N is set at N=2, that is, six.

It can be seen from these drawings that in this aspect, many harmonics are observed from low to high orders, and the variation $\theta1=15°$ where especially the deformation component of the fourth order is significantly reduced is the most suitable in the low-order harmonic region.

In all the aspects illustrated above, the distal end portions of the adjacent magnetic poles MP of the armature core AC are coupled by the bridges. The distal end portions of the adjacent magnetic poles MP are not coupled by bridges in the armature core AC that is inserted into the frame 1 according to a second aspect described below.

Figure 13:
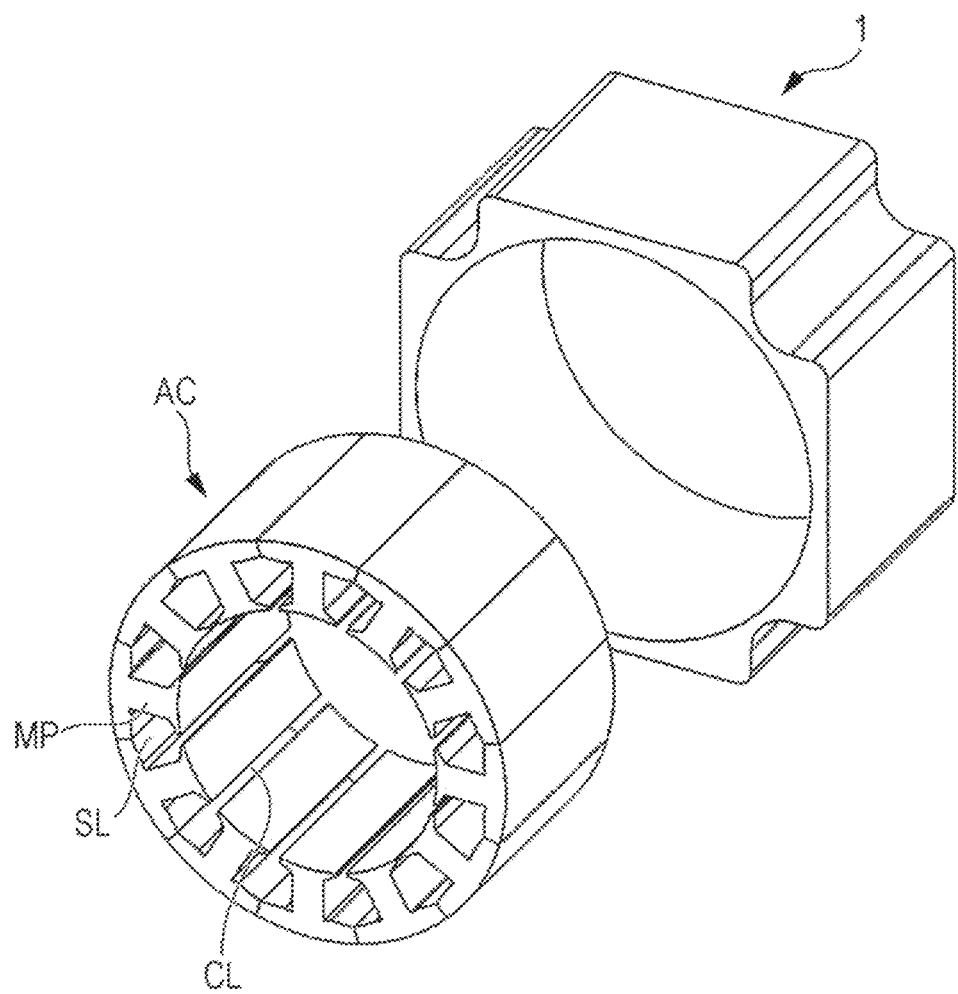
FIG. 13 is a perspective view illustrating a disassembled frame structure according to a second aspect of the embodiment.

FIG. 13 is an exploded perspective view according to the second aspect of the embodiment.

The armature core AC that is formed in the second aspect of the embodiment is formed by stacking second core sheets of an integral structure where all the magnetic poles MP are connected in the circumferential direction on top of each other, or by stacking third core sheets of a T-shape where all the magnetic poles MP are separated in the circumferential direction, combining a predetermined number of the stacked third core sheets at equal intervals, and forming a circular shape. A large difference from the first aspect of the embodiment is the point that the distal end portions of the magnetic poles MP are not connected by bridges to their adjacent magnetic poles MP and openings CL are formed.

In other words, the armature core AC includes the stacked second core sheets of the integral structure where all the magnetic poles are connected in the circumferential direction, or includes the stacked third core sheets of the T-shape where all the magnetic poles MP are separated in the circumferential direction, a predetermined number of the third core sheets being combined at equal intervals and assembled together in a concentric circular form having the openings CL between the distal end portions of the magnetic poles MP.

In other words, the armature core AC can be formed by stacking the second core sheets, or stacking the third core sheets and combining a predetermined number of the stacked third core sheets at equal intervals to assemble them together in a concentric circular form having the openings between the distal end portions of the magnetic poles.

Deformation is also studied in this aspect, defining the variation as $\theta2$. However, since the distal end portions of the magnetic poles MP on the inner periphery are not annularly connected, it is difficult to make an evaluation based on stress. Hence, a comparison was made, using the amount of displacement of the magnetic pole MP as an evaluation index.

Figure 14A:
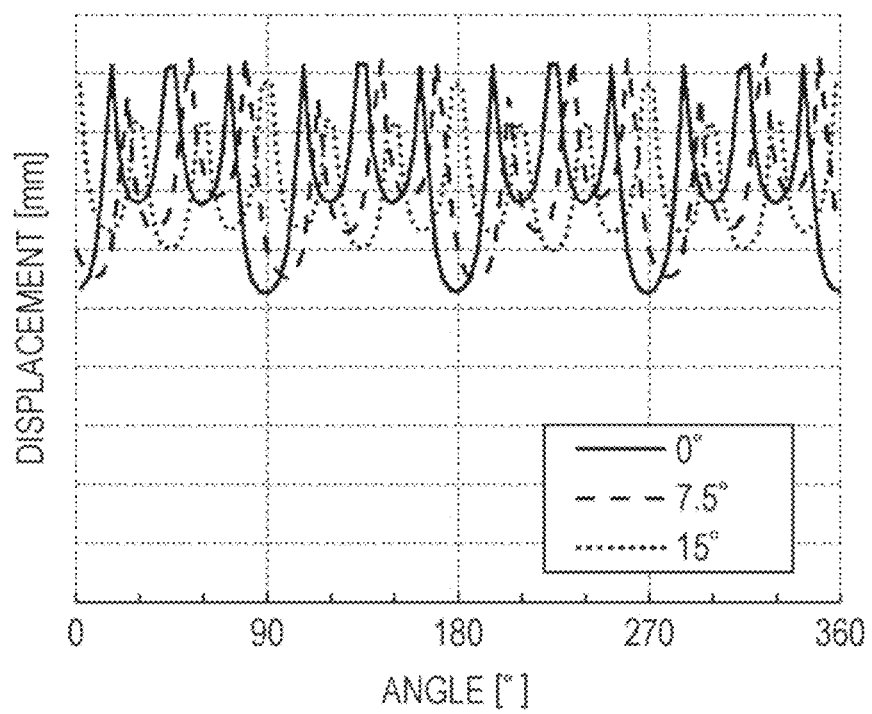
FIG. 14A is a graph illustrating the distribution of stress acting on the inner periphery of an armature core according to the second aspect of the embodiment.
Figure 14B:
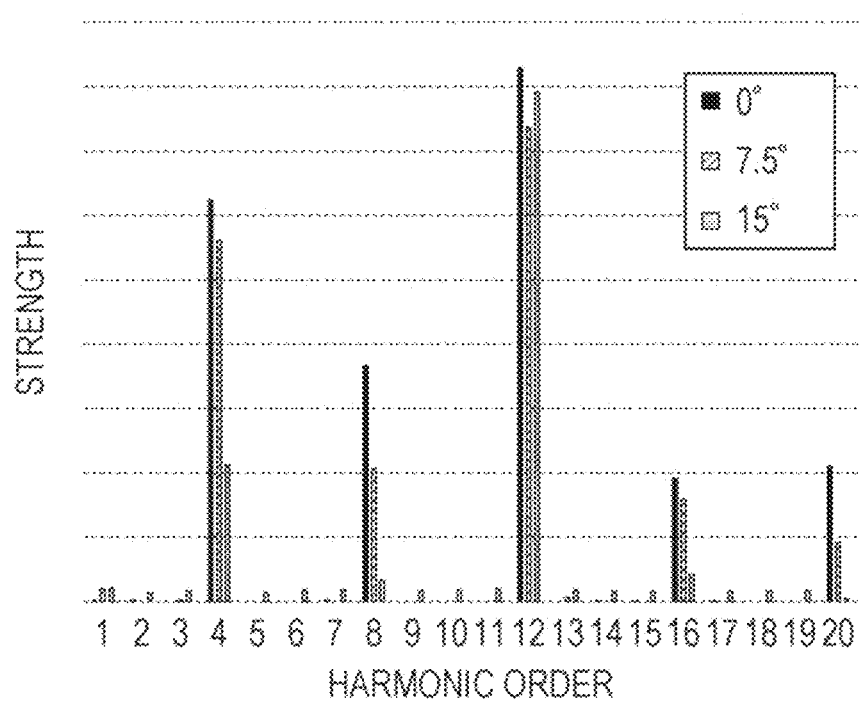
FIG. 14B is a graph illustrating amplitude components included in the von Mises stress according to the second aspect of the embodiment.

FIGS. 14A and 14B illustrate the distribution of the amount of displacement of the magnetic pole MP, and a Fourier analysis result thereof, respectively. In the armature core AC of an aspect related to these drawings, the number of angles of the frame 1 is eight (a 4M-gon (M: natural number) where M=2). Moreover, the number of the magnetic poles MP, that is, the number of the slots SL, of the armature core AC is 12 (the number of the slots SL, 6N, where N=2).

In this aspect, it can be seen that deformation components of the fourth and the eighth harmonic were significantly reduced, and the variation $\theta2=15°$ is the most suitable.

Figure 15A:
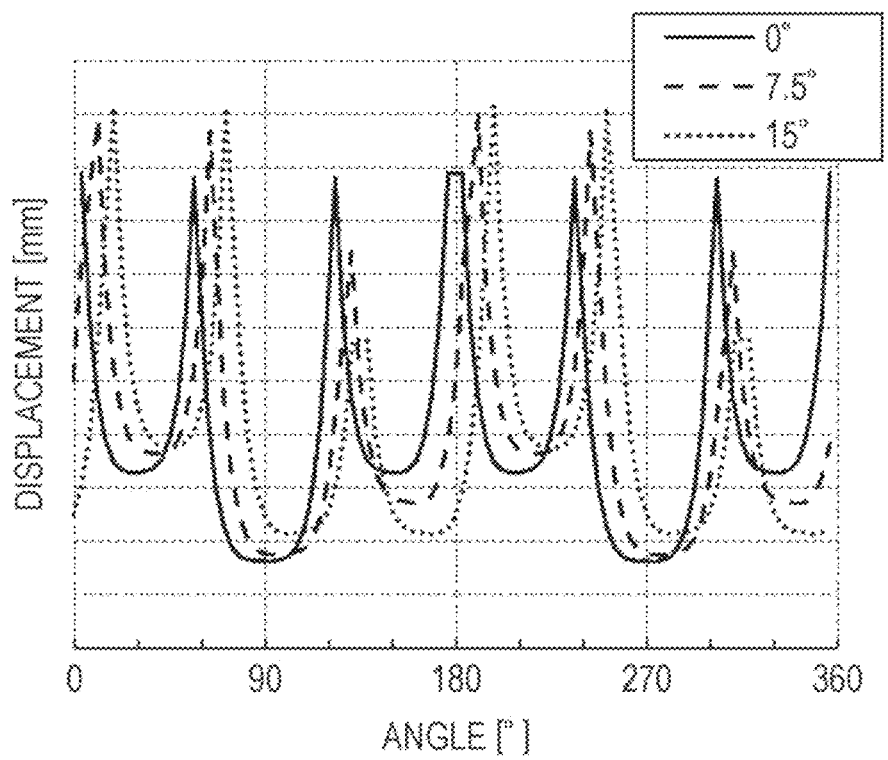
FIG. 15A is a graph illustrating another distribution of stress acting on the inner periphery of the armature core AC according to the second aspect of the embodiment.
Figure 15B:
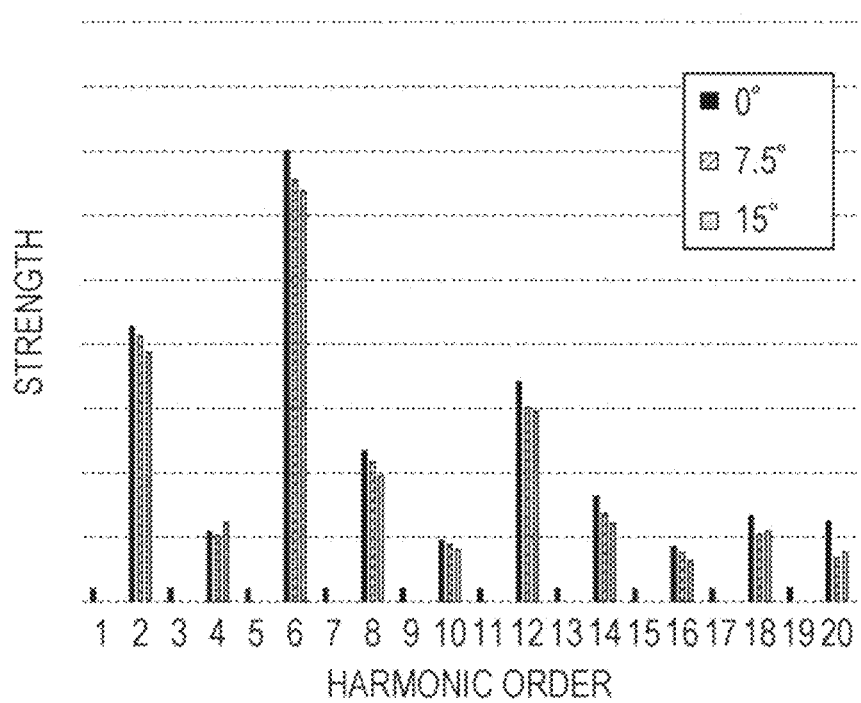
FIG. 15B is a graph illustrating other amplitude components included in the von Mises stress according to the second aspect of the embodiment.

FIGS. 15A and 15B illustrate the distribution of the amount of displacement of the magnetic pole MP, and a Fourier analysis result thereof, respectively. In the armature core AC of an aspect related to these drawings, the number of angles of the frame 1 is eight (a 4M-gon (M: natural number) where M=1). Moreover, the number of the magnetic poles MP, that is, the number of the slots SL, of the armature core AC is six (the number of the slots SL, 6N, where N=1).

In this aspect, differences hardly appeared in the deformation component of each order harmonic of the Fourier analysis result. Hence, it seems that no effect can be obtained. However, a pulsation peak ratio at the variation $\theta2=15°$ is high in the original waveform in the distribution of the amount of displacement of the magnetic pole MP. In other words, there are areas of small and large deformations in response to the stress from the outside, on the inner periphery of the frame 1. In terms of such a deformation, if anything, a constant deformation allows providing periodicity to the distance of an air gap, and maintaining magnetic isostery. Therefore, the variation $\theta2=15°$ is not always the optimum variation, and the optimum variation is the variation $\theta2=0°$.

A summary of the optimum variation (optimum insertion angle) of the above-described aspects of the embodiment is as shown in tables 1 and 2.

TABLE 1

Optimum insertion angle: in a case of the armature core AC with the structure where the distal end portions of the magnetic poles MP are bridged

| Number of angles of frame | Core shape | Number of slots | Magnetic pole pitch angle [°] | Optimum insertion angle [°] | Pitch ratio |
|---|---|---|---|---|---|
| 4 | Symmetric | 6 | 60 | — | — |
| 8 | | 6 | 560 | 15 | 1/4 |
| 4 | | 12 | 30 | 15 | 1/2 |
| 8 | | 12 | 30 | 7.5 | 1/4 |
| 8 | Asymmetric | 12 | 60 | 15 | 1/4 |

TABLE 2

Optimum insertion angle: in a case of the armature core AC with the structure where the distal end portions of the magnetic poles MP are open

| Number of angles of frame | Core shape | Number of slots | Magnetic pole pitch angle [°] | Optimum insertion angle [°] | Pitch ratio |
|---|---|---|---|---|---|
| 4 | Symmetric | 6 | 60 | 60 | 1 |
| 8 | Symmetric | 12 | 30 | 15 | 1/2 |

Let the number of angle of the frame be a 4M-gon, and let the number of the slots SL of the armature be 6N slots SL (M, N: natural number). The optimum insertion angles θ1 and θ2 are given by the following equations:

$$\Theta 1 = \frac{360}{6N} \cdot \frac{1}{2M} [deg] \quad (1)$$

where a case of M=1 and N=1 is excluded, and $$\Theta 2 = \frac{360}{6N} \cdot \frac{1}{M} [deg]. \quad (2)$$

It can be seen from the above equations (1) and (2) that the optimum variation for inserting the armature core AC that has the number of angles with reference to the thickness W of the frame is uniquely determined according to the structure of the distal end portions of the magnetic poles MP of the armature core AC.

If the armature core AC has a core structure of a point asymmetric shape, the number of the slots SL has a relationship where one of the center of the magnetic pole MP and the center of the slot SL is at a point symmetric position, and the other has a point asymmetric shape, with respect to a straight line passing through the center of the magnetic pole MP or the center of the slot SL, and the center of rotation of the motor. In other words, in terms of the shape of the armature core AC, one of a center plane of the magnetic pole MP and a center plane of the slot SL has a rotationally symmetric shape, and the other has a structure other than a rotationally symmetric shape, with respect to the rotation axis Z of the motor. Hence, a plurality of the magnetic poles MP or the slots SL included in a line symmetric area among a plurality of the slots SL or the magnetic poles MP of a point symmetric shape is handled as one unit; accordingly, the armature core AC having a core structure of a point asymmetric shape can be handled similarly to the aspects that have been described up to this point. For example, in a case of the aspect illustrated in FIGS. 11, 12A, and 12B, the actual number of the slots SL is 12. However, the number of the slots SL is simply required to be regarded as six in this aspect.

In other words, the number N in 6N being the number of the slots SL may be counted, taking a plurality of the magnetic poles MP or the slots SL included in an area having rotational symmetry with respect to the rotation axis Z being the center of the rotationally symmetric shape as one magnetic pole MP or slot SL.

The above is the description of the setting of the variation θ. A relationship between such a variation θ and the cogging torque Tc is described below.

Figure 16:
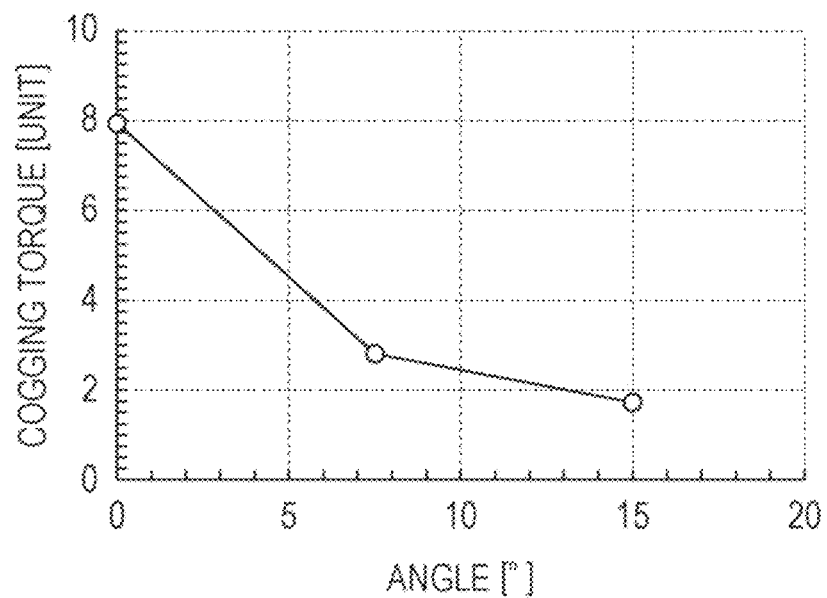
FIG. 16 is a graph illustrating the relationship between variation and cogging torque according to an aspect of the embodiment.

FIG. 16 illustrates the relationship between the variation θ and the cogging torque Tc.

The above-described armature core AC where the distal end portions of the magnetic poles MP are coupled by the bridges, and the frame 1 are used as an example for verification. The number of angles of the frame 1 is eight (a 4M-gon (M: natural number) where M=2). Moreover, the number of the slots SL of the armature core AC with an asymmetric structure is six (the number of the slots SL, 6N, where N=1) (a deemed value due to the asymmetric structure)). It can be seen from FIG. 16 that the cogging torque Tc reduces with increasing variation θ as compared to the cogging torque Tc at the variation θ=0°, and the cogging torque Tc is reduced most at the variation θ=15°.

From the above, it is possible to have an effect to reduce the cogging torque Tc by optimizing the insertion angle. However, in terms of actual manufacture of a motor, it is preferable to use a position determiner in the rotation direction to maintain an appropriate variation position for, for example, the rotation torque T acting on the armature core AC of the motor.

Such a position determiner may include any kind of member as illustrated by example below as long as it is a member that can maintain the positional relationship between the frame 1 and the armature core AC.

Figure 17:
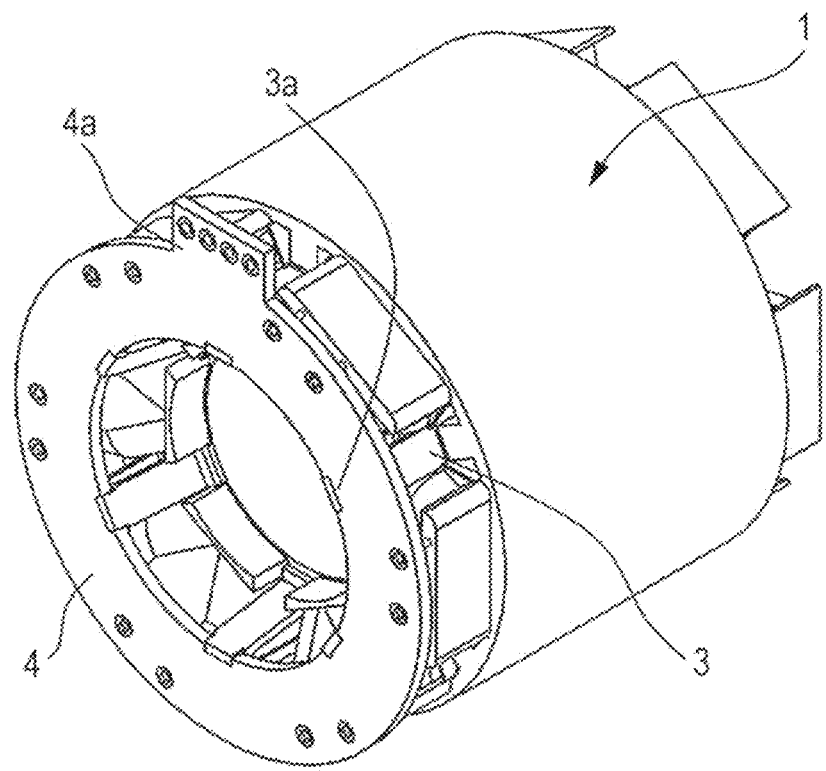
FIG. 17 is a perspective view illustrating a position determiner that maintains the variation of the armature core according to an aspect of the embodiment.

FIG. 17 illustrates an aspect of the position determiner.

In this aspect, a printed board 4 used to connect an end of the armature winding and a bobbin 3 or insulator (not illustrated) are coupled by a base 3a. A projection 4a provided to the printed board 4 for, for example, wiring, connection, and connector placement is used to fix at a reference position. Accordingly, the position is determined. In other words, the armature core AC is fixed at the variation position by use of the position determiner (projection 4a) formed on the printed board 4.

Figure 18:
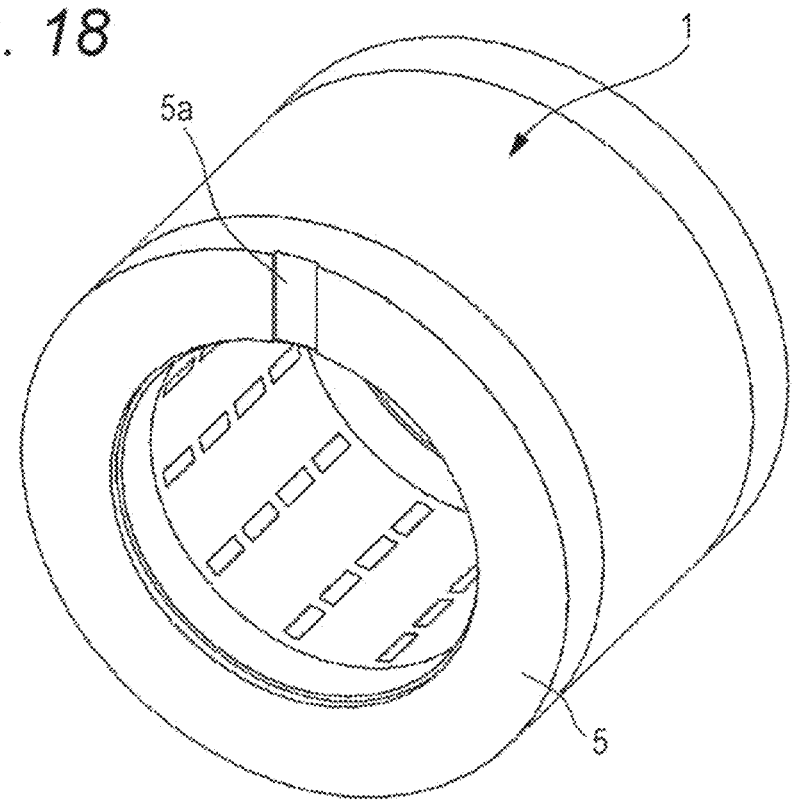
FIG. 18 is a perspective view illustrating another position determiner that maintains the variation of the armature core according to an aspect of the embodiment.

FIG. 18 illustrates another aspect of the position determiner.

In this aspect, a recess 5a provided to a part of the armature winding, or to a part of a filled resin 5 formed by molding with resin after a connection process is used as a reference position for determining the position (the position determiner).

In short, the position determiner is not limited to the above projection 4a of the printed board, or the recess 5a provided to a part of the filled resin. The position determiner may be, for example, a hole, recess, or projection. It can be safely said that the position determiner has any kind of structure as long as the position can be determined.

Moreover, the reference position for determining the position is not formed only on such a peripheral member, but it is also possible to form a position determination function on the armature core AC itself on a side, which is exposed to an end surface as viewed in the direction of the rotation axis Z, of the motor M. In this case, the position determination mechanism (the position determiner) is provided to a part of at least one first, second, or third core sheet.

Figure 19:
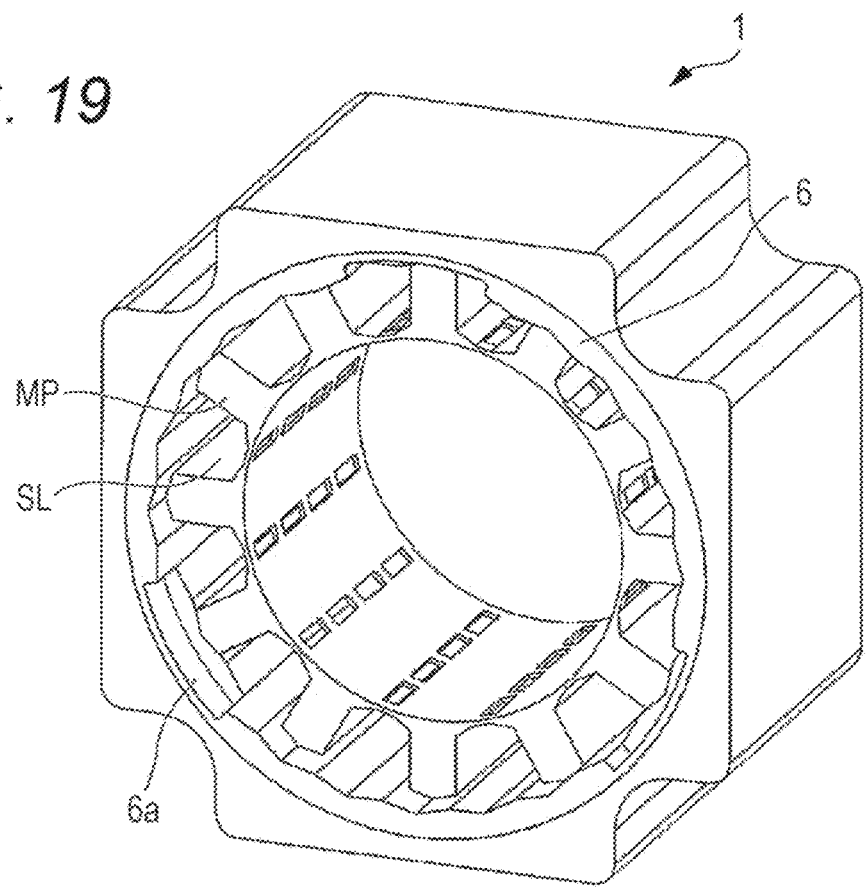
FIG. 19 is a perspective view illustrating still another position determiner that maintains the variation of the armature core according to an aspect of the embodiment.

FIG. 19 illustrates still another aspect of the position determiner.

In the aspect illustrated in FIG. 19, the core sheet includes a recess 6a, a hole, or the like for determining the position, in a portion of a back yoke 6 of the armature core AC. The core sheets are stacked in such a manner that some sheets overhang a coil end. This portion is the coil end; therefore, it does not directly influence the torque T of the motor M. Hence, the working of this portion for forming a hole or the like is unlikely to have an adverse effect on the performance of the motor M.

In this manner, the frame structure of the motor M may further include the position determiner that fixes the armature core AC at the variation position, on the printed board 4 used to connect an end of a winding of the armature core AC.

Alternatively, the frame structure of the motor M may further include the position determiner (the recess 5a) that fixes the armature core AC at the variation position, in a part of the molded portion (the filled resin 5) of the motor M. In other words, at least a part (the filled resin 5) of the motor M may be molded, and the armature core AC may be fixed at the variation position by use of the position determiner (the recess 5a) formed in a part of the molded portion.

Alternatively, in the frame structure of the motor M, the position determiner that fixes the armature core AC at the variation position may be formed in a part of at least one first or second core sheet on the side, which is exposed to the end surface as viewed in the direction of the rotation axis Z, of the motor M. In other words, the armature core AC may be fixed at the variation position by use of the position determiner formed in a part of at least one second or third sheet on the side, which is exposed to the end surface as viewed in the direction of the rotation axis Z, of the motor M.

Alternatively, the frame structure of the motor M may further include the position determiner that fixes the armature core AC at the variation position, at the distal end portion of the magnetic pole MP, or in the opening of the slot SL, of the armature core AC. In other words, the distal end portion of the magnetic pole MP, or the opening of the slot SL, of the armature core AC may be used as the position determiner that fixes the armature core AC at the variation position.

In addition, it is also possible to set a slot of the opening CL between the magnetic poles MP of the armature core AC as the reference position.

Up to this point various aspects of the embodiment have been described. They do not at all limit the technical scope of the present disclosure specified by the description of the claims. They are merely examples of aspects of the embodiment. The technical scope of the present disclosure is not limited by the presence of these aspects for interpretation.

Moreover, the present disclosure relates to a frame structure of a synchronous motor and a method for manufacturing a frame and an armature. Furthermore, the present disclosure relates to a frame structure that reduces uneven stress acting on an armature core by inserting the armature core into a frame at a specific angle in a motor including magnetic field sources having magnets on a rotor, and reduces cogging torque, and relates to a method for manufacturing the same.

Moreover, embodiments of the present disclosure may be a first and a second frame structure of a motor and a first and a second method for manufacturing a frame and armature of a motor below.

The first frame structure of a motor is a frame structure of a motor including magnetic field sources having magnets on a rotor, where an outer periphery of the frame forms a polygon, an inner periphery of the frame forms a circular shape, the number of angles of the polygon is defined by the number of peaks of the thickness of the frame in cross section as viewed in a radial direction from a rotation axis Z of the frame, and an armature core is inserted into the inner periphery of the frame. In the frame structure of the motor, in terms of the armature core, only a plurality of first core sheets where distal end portions of adjacent magnetic poles on the rotation axis Z side are coupled by bridges is stacked, or a plurality of both the first core sheets and second core sheets where openings are formed between the distal end portions of the adjacent magnetic poles without coupling the distal end portions is stacked, and the armature core is inserted into the frame in such a manner as to form a variation θ within a predetermined range in a circumferential direction between a reference line that is orthogonal to two opposing sides of the frame and passes through the rotation axis Z and a straight line linking the magnetic poles symmetric about a point with respect to the rotation axis Z when the number of angles of the frame is 4M (M is a natural number, and M≥1) and the number of slots of the armature core is 6N (N is a natural number, and N≥1).

The second frame structure of a motor is a frame structure of a motor including magnetic field sources having magnets on a rotor, where an outer periphery of the frame forms a polygon, an inner periphery of the frame forms a circular shape, the number of angles of the polygon is defined by the number of peaks of the thickness of the frame in cross section as viewed in a radial direction from a rotation axis Z of the frame, and an armature core is inserted into the inner periphery of the frame. In the frame structure of the motor, in terms of the armature core, second core sheets of an integral structure where all magnetic poles are connected in a circumferential direction of the second core sheet are stacked, or third core sheets of a T-shape where all the magnetic poles are separated in a circumferential direction of the third core sheet are stacked, and a predetermined number of the stacked third core sheets are combined at equal intervals to be assembled together in a concentric circular shape having openings between distal end portions of the magnetic poles, and the armature core is inserted into the frame in such a manner as to form a variation θ within a predetermined range in the circumferential direction between a reference line that is orthogonal to two opposing sides of the frame and passes through the rotation axis Z and a straight line linking the magnetic poles symmetric about a point with respect to the rotation axis Z when the number of angles of the frame is 4M (M is a natural number, and M≥1) and the number of slots of the armature core is 6N (N is a natural number, and N≥1).

The first method for manufacturing a frame and armature of a motor is as follows: in a frame structure of a motor including magnetic field sources having magnets on a rotor, where an outer periphery of the frame forms a polygon, an inner periphery of the frame forms a circular shape, the number of angles of the polygon is defined by the number of peaks of the thickness of the frame in cross section as viewed in a radial direction from a rotation axis Z of the frame, and an armature core is inserted into the inner periphery of the frame, in terms of the armature core, only a plurality of first core sheets where distal end portions of adjacent magnetic poles on the rotation axis Z side are coupled by bridges is stacked, or a plurality of both the first core sheets and second core sheets where openings are formed between the distal end portions of the adjacent magnetic poles without coupling the distal end portions is stacked, and the armature core is inserted into the frame by use of a position determiner in such a manner as to form a variation θ within a predetermined range in a circumferential direction between a reference line that is orthogonal to two opposing sides of the frame and passes through the rotation axis Z and a straight line linking the magnetic poles symmetric about a point with respect to the rotation axis Z when the number of angles of the frame is 4M (M is a natural number, and M≥2) and the number of slots of the armature core is 6N (N is a natural number, and N≥2).

The second method for manufacturing a frame and armature of a motor is as follows: in a frame structure of a motor including magnetic field sources having magnets on a rotor, where an outer periphery of the frame forms a polygon, an inner periphery of the frame forms a circular shape, the number of angles of the polygon is defined by the number of peaks of the thickness of the frame in cross section as viewed in a radial direction from a rotation axis Z of the frame, and an armature core is inserted into the inner periphery of the frame, in terms of the armature core, second core sheets of an integral structure where all magnetic poles are connected in a circumferential direction of the second core sheet are stacked, or third core sheets of a T-shape where all the magnetic poles are separated in a circumferential direction of the third core sheet are stacked, and a predetermined number of the stacked third core sheets are combined at equal intervals to be assembled together in a concentric circular shape having openings between distal end portions of the magnetic poles, and the armature core is inserted into the frame by use of a position determiner in such a manner as to form a variation θ within a predetermined range in the circumferential direction between a reference line that is orthogonal to two opposing sides of the frame and passes through the rotation axis Z and a straight line linking the magnetic poles symmetric about a point with respect to the rotation axis Z when the number of angles of the frame is 4M (M is a natural number, and M≥1) and the number of slots of the armature core is 6N (N is a natural number, and N≥2).

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A frame structure of a motor, comprising:
   a frame including a polygonal outer periphery, and a circular inner periphery; and
   an armature core to be inserted into the inner periphery of the frame, wherein
   the armature core includes a plurality of first core sheets stacked on top of each other, or a plurality of the first core sheets and second core sheets, which are stacked on top of each other,
   in the first core sheet, distal end portions of adjacent magnetic poles on a rotation axis side of the frame are coupled by bridges,
   in the second core sheet, openings are formed between the distal end portions of the adjacent magnetic poles on the rotation axis side without coupling the distal end portions,
   the number of angles of the polygon of the outer periphery of the frame is defined on the basis of the number of peaks of the thickness of the frame in cross section as viewed in a radial direction from the rotation axis of the frame,
   the armature core is inserted into the frame in such a manner as to form a variation θ within a predetermined range in a circumferential direction between a reference line that is orthogonal to two opposing sides of the frame and passes through the rotation axis, and a straight line linking magnetic poles symmetric about a point with respect to the rotation axis, assuming that the number of angles of the frame is 4M where M is a natural number and M≥1, and the number of slots of the armature core is 6N where N is a natural number and N≥1 and
   the variation θ is an angle θ1 determined by the following equation:

$$\Theta 1 = \frac{360}{6N} \cdot \frac{1}{2M} [deg]$$

where a case of M=1 and N=1 is excluded.

2. The frame structure of the motor according to claim 1, wherein
   adjacent two slots are placed in such a manner as to be symmetric about a line with respect to the magnetic pole placed therebetween, and
   the armature core is asymmetric about a center of the slot.

3. The frame structure of the motor according to claim 1, further comprising a position determiner configured to fix the armature core at the variation position, on a printed board used to connect an end of a winding of the armature core.

4. The frame structure of the motor according to claim 1, further comprising a position determiner configured to fix the armature core at the variation position, in a part of a molded portion of the motor.

5. The frame structure of the motor according to claim 1, wherein a position determiner configured to fix the armature core at the variation position is formed in a part of at least one first or second core sheet on a side, which is exposed to an end surface as viewed in a direction of the rotation axis, of the motor.

6. The frame structure of the motor according to claim 1, further comprising a position determiner configured to fix the armature core at the variation position, at the distal end portion of the magnetic pole, or the opening of the slot, of the armature core.

7. A frame structure of a motor, comprising:
   a frame including a polygonal outer periphery, and a circular inner periphery; and
   an armature core to be inserted into the inner periphery of the frame, wherein the armature core includes
   stacked second core sheets of an integral structure where all magnetic poles are connected in a circumferential direction of the second core sheet, or
   stacked third core sheets of a T-shape where all the magnetic poles are separated in a circumferential direction of the third core sheet, a predetermined number of the stacked third core sheets are combined at equal intervals to be assembled together in a concentric circular form having opening between distal end portions of the magnetic poles,
   the number of angles of the polygon of the outer periphery of the frame is defined on the basis of the number of peaks of the thickness of the frame in cross section as viewed in a radial direction from a rotation axis of the frame,
   the armature core is inserted into the frame in such a manner as to form a variation θ within a predetermined range in the circumferential direction between a reference line that is orthogonal to two opposing sides of the frame and passes through the rotation axis, and a straight line linking the magnetic poles symmetric about a point with respect to the rotation axis, assuming that the number of angles of the frame is 4M where M is a natural number and M≥1, and the number of slots of the armature core is 6N where N is a natural number and N≥1 and the variation θ is an angle θ2 determined by the following equation:

$$\Theta 2 = \frac{360}{6N} \cdot \frac{1}{M}[deg].$$

8. The frame structure of the motor according to claim 7, wherein
adjacent two slots are placed in such a manner as to be symmetric about a line with respect to the magnetic pole placed therebetween, and
the armature core is asymmetric about a center of the slot.

9. The frame structure of the motor according to claim 7, further comprising a position determiner configured to fix the armature core at the variation position, on a printed board used to connect an end of a winding of the armature core.

10. The frame structure of the motor according to claim 7, further comprising a position determiner configured to fix the armature core at the variation position, in a part of a molded portion of the motor.

11. The frame structure of the motor according to claim 7, wherein a position determiner configured to fix the armature core at the variation position is formed in a part of at least one second or third core sheet on a side, which is exposed to an end surface as viewed in a direction of the rotation axis, of the motor.

12. The frame structure of the motor according to claim 7, further comprising a position determiner configured to fix the armature core at the variation position, at the distal end portion of the magnetic pole, or the opening of the slot, of the armature core.

13. A method for manufacturing a frame and armature of a motor, comprising forming an armature core to be inserted into an inner periphery of a frame including a polygonal outer periphery and the circular inner periphery by stacking a plurality of first core sheets on top of each other, or stacking the first core sheets and second core sheets alternately, wherein
in the first core sheet, distal end portions of adjacent magnetic poles on a rotation axis side of the frame are coupled by bridges,
in the second core sheet, openings are formed between the distal end portions of the adjacent magnetic poles on the rotation axis side without coupling the distal end portions,
the method further comprises inserting the armature core into the frame by use of a position determiner in such a manner as to form a variation θ within a predetermined range in a circumferential direction between a reference line that is orthogonal to two opposing sides of the frame and passes through the rotation axis, and a straight line linking the magnetic poles symmetric about a point with respect to the rotation axis, assuming that the number of angles of the polygon of the outer periphery of the frame is 4M where M is a natural number and M≥2, and the number of slots of the armature core is 6N where N is a natural number and N≥2),
the number of angles of the frame is defined on the basis of the number of peaks of the thickness of the frame in cross section as viewed in a radial direction from the rotation axis of the frame, and
the variation θ is an angle θ1 determined by the following equation:

$$\Theta 1 = \frac{360}{6N} \cdot \frac{1}{2M}[deg]$$

where a case of M=1 and N=1 is excluded.

14. A method for manufacturing a frame and armature of a motor, comprising:
forming an armature core to be inserted into an inner periphery of a frame including a polygonal outer periphery and the circular inner periphery by stacking second core sheets of an integral structure where all magnetic poles are connected in a circumferential direction of the second core sheet, or stacking third core sheets of a T-shape where all the magnetic poles are separated in a circumferential direction of the third core sheet and combining a predetermined number of the stacked third core sheets at equal intervals to assemble the third core sheets together in a concentric circular form having openings between distal end portions of the magnetic poles; and
inserting the armature core into the frame by use of a position determiner in such a manner as to form a variation θ within a predetermined range in the circumferential direction between a reference line that is orthogonal to two opposing sides of the frame and passes through the rotation axis, and a straight line linking the magnetic poles symmetric about a point with respect to the rotation axis, assuming that the number of angles of the polygon of the outer periphery of the frame is 4M where M is a natural number and M≥1, and the number of slots of the armature core is 6N where N is a natural number and N≥2, wherein
the number of angles of the frame is defined on the basis of the number of peaks of the thickness of the frame in cross section as viewed in a radial direction from a rotation axis of the frame, and
the variation θ is an angle θ2 determined by the following equation:

$$\Theta 2 = \frac{360}{6N} \cdot \frac{1}{M}[deg].$$

15. The method for manufacturing the frame and armature of the motor according to claim 13, further comprising fixing the armature core at the variation position by use of the position determiner formed on a printed board used to connect an end of a winding of the armature core.

16. The method for manufacturing the frame and armature of the motor according to claim 13, further comprising:
molding at least a part of the motor; and
fixing the armature core at the variation position by use of the position determiner formed in a part of the molded portion.

17. The method for manufacturing the frame and armature of the motor according to claim 13, further comprising fixing the armature core at the variation position by use of the position determiner formed in a part of at least one second or third core sheet on a side, which is exposed to an end surface as viewed in a direction of the rotation axis, of the motor.

18. The method for manufacturing the frame and armature of the motor according to claim 13, further comprising using the distal end portion of the magnetic pole, or the opening of the slot, of the armature core as the position determiner configured to fix the armature core at the variation position.

19. The method for manufacturing the frame and armature of the motor according to claim 13, wherein the position determiner includes a hole, a recess, or a projection.

* * * * *